US010085233B2

(12) United States Patent
Deogun et al.

(10) Patent No.: US 10,085,233 B2
(45) Date of Patent: Sep. 25, 2018

(54) METHODS FOR DETERMINING PAGING OCCASIONS IN EDRX CYCLE AND MONITORING PAGING OCCASIONS BASED ON CEL

(71) Applicant: Samsung Electronics Co., Ltd., Suwon-si (KR)

(72) Inventors: Pravjyot Singh Deogun, Bengaluru (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/476,854

(22) Filed: Mar. 31, 2017

(65) Prior Publication Data
US 2017/0303235 A1    Oct. 19, 2017

(30) Foreign Application Priority Data

Mar. 31, 2016 (IN) ............................. 201641011491
Mar. 31, 2016 (IN) ............................. 201641011492
Mar. 28, 2017 (IN) ............................. 201641011491

(51) Int. Cl.
*H04W 68/00* (2009.01)
*H04W 68/02* (2009.01)
*H04W 76/28* (2018.01)

(52) U.S. Cl.
CPC ......... *H04W 68/02* (2013.01); *H04W 68/005* (2013.01); *H04W 76/28* (2018.02)

(58) Field of Classification Search
CPC .. H04W 68/02; H04W 68/005; H04W 76/048
(Continued)

(56) References Cited

U.S. PATENT DOCUMENTS

2004/0023672 A1    2/2004 Terry
2009/0275368 A1 *  11/2009 Wang .................... H04W 28/08
                                                    455/574
(Continued)

FOREIGN PATENT DOCUMENTS

WO        2004013978 A2    2/2004
WO        2009135145 A1    11/2009
WO    WO 2017049625 A1 *  3/2017  ............ H04W 68/02

OTHER PUBLICATIONS

3rd Generation Partnership Project; Technical Specification Group Radio Access Network; Evolved Universal Terrestrial Radio Access (E-UTRA); User Equipment (UE) Procedures in Idle Mode (Release 13); 3GPP TS 36.304 V13.1.0; Mar. 2016; 42 pages.
(Continued)

*Primary Examiner* — Khai M Nguyen

(57) ABSTRACT

Embodiments herein provide a method for determining PO by UEs in an eDRX cycle. The method includes determining PHs in the eDRX cycle based on estimated values of UE_ID_H and number of hyper-frames in the eDRX cycle. The method includes determining a first radio frame of PTW based on a determined value of $N_{PTW}$ and $i_{eDRX}$. The method includes determining a last radio frame of PTW based on the first radio frame and length of the PTW. The method includes determining PFs in the PTW. The determination of PFs is based on the UE_ID. The method includes determining the POs, in each of the determined PFs, based on an index associated with each of the POs. The index associated with each PO is computed based on the UE_ID, number of frames available for paging in a DRX cycle, and number of sub-frames available for paging in each PF.

12 Claims, 12 Drawing Sheets

(58) Field of Classification Search
USPC .................................................. 455/458, 574
See application file for complete search history.

(56) References Cited

U.S. PATENT DOCUMENTS

| | | |
|---|---|---|
| 2010/0279715 A1 | 11/2010 | Alanara et al. |
| 2015/0365916 A1 | 12/2015 | Wang et al. |
| 2016/0044605 A1* | 2/2016 | Vajapeyam ......... H04W 52/322 370/311 |
| 2016/0057738 A1* | 2/2016 | Lee .................. H04W 52/0216 370/329 |
| 2016/0330791 A1* | 11/2016 | Vajapeyam ......... H04W 76/048 |
| 2018/0091993 A1* | 3/2018 | Siomina ................ H04W 24/10 |
| 2018/0124864 A1* | 5/2018 | Lee .................... H04W 76/048 |

OTHER PUBLICATIONS

Foreign Communication from Related Counterpart Application; PCT Application No. PCT/KR2017/003523; International Search Report dated Jul. 18, 2017; 5 pages.

* cited by examiner

METHODS FOR DETERMINING PAGING OCCASIONS IN EDRX CYCLE AND MONITORING PAGING OCCASIONS BASED ON CEL

CROSS-REFERENCE TO RELATED APPLICATION AND CLAIM OF PRIORITY

The present application claims the benefit under 35 U.S.C. § 119(a) of the Indian Application Numbers, 201641011491 filed on Mar. 31, 2016, 201641011492 filed on Mar. 31, 2016 and 201641011491 filed on Mar. 28, 2017, the entire disclosures of each of which are hereby incorporated by reference.

TECHNICAL FIELD

The embodiments herein relate to paging procedures and more particularly to methods for determining Paging Occasions (PO) to be monitored by a User Equipment (UE) in extended Discontinuous Reception (eDRX) and monitoring paging occasions based on Coverage Enhancement Level (CEL).

BACKGROUND

In long term evolution (LTE), the paging procedure is performed by a Node B (NB) to notify a user equipment (UE) about incoming sessions and changes in system information. The UE listens for paging messages addressed to the UE using a periodic search window which is configured by a cell, in which the UE is currently camped. When the UE detects a paging message addressed by the NB, the UE initiates the system access procedure for connection establishment. The NB configures paging occasions (PO) for each UE, at which the NB can transmit physical downlink control channel (PDCCH) message containing the scheduling information of Physical Downlink Shared Channel (PDSCH) message (i.e. paging message) for the UE. Each PDSCH message may consist of paging messages for multiple UEs. Each UE monitors a subset of the system frames and subframes for paging based on following identifiers configured for the UE: UE Identity (UE_ID), $T_{eDRX,H}$ (extended DRX cycle length in hyper frames, if configured), L (length of paging transmission window in seconds, if configured), and T (length of the DRX cycle).

Specifically, if the UE is configured with eDRX mode, the UE monitors hyper-frames known as paging hyper-frames (PH), which satisfies the following relation:

$$H\text{-}SFN \bmod T_{eDRX,H} = (UE\_ID \bmod T_{eDRX,H}),$$

in which UE_ID is UE identity derived from international mobile subscriber identity (IMSI) of UE.

Within the configured PH, a Paging Transmission Window (PTW) is defined. The UE monitors the system frames for paging (based on Paging Frames (PF) calculation) within the PTW. Each PF may consist of a single or multiple POs. Each PO occupies a sub-frame of a particular PF. The starting System Frame Number (SFN) for the PTW is as follows:

$$SFN = 256 * i_{eDRX},$$

in which $i_{eDRX} = \text{floor}(UE\_ID/T_{eDRX,H}) \bmod 4$

Within the PTW, the UEs monitor POs within PFs. The PFs are determined as follows:

$$SFN \bmod T = (T \text{ div } N) * (UE\_ID \bmod N)$$

The index $i_s$ is pointing to a PO from sub-frame pattern is derived as follows:

$$i_s = \text{floor}(UE\_ID/N) \bmod N_s$$

here, nB=4T, 2T, T, T/2, T/4, T/8, T/16, T/32; N=min (T,nB); $N_s$=max (1,nB/T).

The NB determines the POs which are being monitored by the each UE. The NB transmits the paging message for a particular UE in the POs, which that particular UE is monitoring. The usage of same value of UE_ID for computing of PH and PF results in an uneven distribution of paging load (i.e. number of UEs monitoring a radio resource for paging) across different POs. In an example, within one hyper-frame it is possible that a thousand UEs are monitoring a particular system frame number (SFN), while all the remaining SFNs available for paging are not monitored by any of the UEs. The variation in the distribution of number of UEs monitoring across different POs is more pronounced when the common divisor of $T_{eDRX,H}$ and T is large in number. Since, one of the primary objectives of PO computation is non-varying paging load distribution across radio resources available for paging; the variation of the paging load distribution may lead to performance degradation of the overall system. Specifically, varying paging load distribution may lead to radio resource wastage and increased delay for the UEs.

For coverage enhancement (CE) mode, physical downlink shared channel (PDSCH) and physical downlink control channel (PDCCH) messages, respectively, have to be repeated multiple times to ensure that UEs operating in the CE mode are able to decode the PDCCH and PDSCH reliably. Since, PO configuration for a UE does not utilize the CE Level (CEL) to determine the POs to be monitored by the UE, each PO can be monitored by UEs with different CELs. As the PDSCH may contain paging message for multiple UEs, for reliable decoding, the PDCCH and the PDSCH need to be transmitted at least with a repetition level corresponding to the UE with highest value of CEL, which is to be paged in the given PO. Hence, this leads to unnecessary repetitions for UEs with lower CEL values monitoring the same PO. This may result in excessive power consumption for the UEs with low CEL value, in monitoring redundant PDCCH and PDSCH. It also results in radio resource wastage (and reduced capacity) from network perspective as the UEs with low CEL value need to be paged corresponding to highest repetition level.

Thus, there is a need of having a method which allows uniform distribution of UEs across different POs when configured with eDRX and another method which allows categorizing UEs based on the CEL to monitor PO.

The above information is presented as background only to help the reader for understanding the present invention. Applicants have made no determination and make no assertion as to whether any of the above might be applicable as Prior Art with regard to the present application.

SUMMARY

To address the above-discussed deficiencies, it is a primary object provides a method for determining paging occasions (PO) in extended discontinuous reception (eDRX) cycle by user equipments (UE). The method includes determining Paging Hyper-frames (PH) in the eDRX cycle based on estimated values of eDRX UE Identity (UE_ID_H) and number of hyper-frames in an eDRX cycle. The method includes determining a first radio frame of Paging Transmission Window (PTW), in the PH, based on a determined value of PTW offset parameter ($N_{PTW}$) and PTW offset index ($i_{eDRX}$), in which $i_{eDRX}$ is based on the UE_ID_H. The method includes determining a last radio frame of PTW based on the determined first radio frame and length of the PTW, in which the length of the PTW corresponds to a number of frames in the PTW. The method includes determining paging frames (PF) in the PTW, in which the determination is based on the UE_ID. The method includes determining the POs in each of the determined PFs based on an index associated with each of the POs. The index associated with each PO is computed based on the UE_ID, number of frames available for paging in the DRX cycle, and number of sub-frames available for paging in each PF.

In an embodiment, the method includes computing UE_ID based on an international mobile subscriber identity (IMSI). Further, the method includes computing UE_ID_H based on one of a system architecture evolution-temporary mobile subscriber identity (S-TMSI), a mobile subscriber identity number (MSIN), a mobility management entity-TMSI (M-TMSI), a globally unique temporary ID (GUTI), a temporary identity number (TIN), a cell-radio network temporary identifier (C-RNTI), and an international mobile equipment identity (IMEI).

In an embodiment, the method includes computing the UE_ID_H based on the IMSI. Further, the method includes computing UE_ID based on one of the S-TMSI, the MSIN, the M-TMSI, the GUTI, the TIN, the C-RNTI, and the IMEI.

In an embodiment, the method includes computing the UE_ID based on the IMSI. Further, the method includes computing UE_ID_H based on the computed UE_ID and one of the S-TMSI, the MSIN, the M-TMSI, the GUTI, the TIN, the C-RNTI, and the IMEI.

In an embodiment, the method includes computing the UE_ID_H based on the IMSI. Further, the method includes computing the UE_ID based on the computed UE_ID_H and one of the S-TMSI, the MSIN, the M- the TMSI, the GUTI, the TIN, the C-RNTI, and the IMEI.

In an embodiment, the method includes computing the UE_ID based on the IMSI. Further, the method includes computing the UE_ID_H based on the IMSI and a predefined value. The predefined value can be 256, 512, 1024, 2048, and 4096.

In an embodiment, the method includes computing UE_ID based on the IMSI. Further, the method includes computing UE_ID_H based on the IMSI and a predefined value, in which the predefined value is based on number of frames available for paging in DRX cycle and number of sub-frames available for paging in a PF.

In an embodiment, the method includes computing UE_ID based on the IMSI. Further, the method includes computing UE_ID_H based on the IMSI and number of frames available for paging in the DRX cycle.

In an embodiment, the method includes computing UE_ID_H based on the IMSI. Further, the method includes computing UE_ID based on the IMSI and a predefined value. The predefined value can be 256, 512, 1024, 2048, and 4096.

In an embodiment, the method includes computing UE_ID_H based on the IMSI. Further, the method includes computing UE_ID based on an identifier received from mobile management entity (MME) during tracking area update (TAU) procedure. In an example, the identifier is provided by the MME through non-access stratum (NAS) signaling.

In an embodiment, the method includes computing the UE_ID based on the IMSI. Further, the method includes computing the UE_ID_H based on an identifier received from the MME during the TAU procedure. In an example, the identifier is provided by the MME through NAS signaling.

In an embodiment, the method includes determining the $N_{PTW}$ based on one of length of the PTW, system information, and a predetermined value. The value of $N_{PTW}$ is broadcast by the NB in the system information. The broadcasted values can be 64, 128, 256, 512 and 124. The predetermined value can be either 64 or 128.

Accordingly embodiments herein provide a method for determining POs in eDRX cycle by UEs. The method includes determining PHs in the eDRX cycle based on estimated values UE_ID_H and number of hyper-frames in the eDRX cycle. The method includes determining a first radio frame of PTW, in the PH, based on the $N_{PTW}$ and $i_{eDRX}$, in which $i_{eDRX}$ is based on the UE_ID_H. The method includes determining a last radio frame of PTW based on the determined first radio frame and length of the PTW, wherein the length of the PTW corresponds to a number of frames in the PTW. The method includes determining PFs in the PTW, in which the determination is based on the UE_ID, in which the estimated value of UE_ID is based on a determined value of $N_{PTW}$. The method includes determining the POs in each of the determined PFs based on an index associated with each of the POs. The index associated with each PO is computed based on the UE_ID, number of frames available for paging in the DRX cycle, and number of sub-frames available for paging in each PF.

In an embodiment, the method includes computing UE_ID_H based on the IMSI. Further, the method includes computing UE_ID based on the IMSI and a predetermined number. The predetermined number is based on the $N_{PTW}$ and a predefined number.

Accordingly embodiments herein provide a method for performing PO monitoring by a UE. The method includes determining schedule of POs in radio resources across one of subframes in paging frames (PF), PFs in a CEL paging cycle and subframes in the CEL paging cycle. The schedule of POs is based on coverage enhancement level (CEL) values. The method includes determining at least one of an index value of a PO in a PF, an index value of a PF in the CEL paging cycle, and an index value of a PO in the CEL paging cycle. The method includes performing a mapping of at least one of the determined index value of the PO in the PF with a subframe number (SN) in the PF, the determined index value of the PF in the CEL paging cycle with a system frame number (SFN), the determined index value of the PO in the CEL paging cycle with a SFN, and the determined index value of the PO in the CEL paging cycle with a SN in a PF in the CEL paging cycle. The performance of mapping is based on mapping functions. The method includes monitoring the PO in the mapped at least one of SN and SFN.

Accordingly embodiments herein provide a method for transmitting a paging message in a current connection establishment procedure by a Node B (NB). The method includes estimating a candidate CEL value of UEs based on at least one of a CEL value received from the UEs in a previous connection establishment procedure, maximum CEL value supported by a cell, number of attempts of paging message delivery by a mobility management entity (MME) to the NB (MME repetition number) and number of attempts of paging message delivery by the NB to the UEs (radio access network (RAN) repetition number). The UEs are camped in a cell. The method includes selecting a predefined number of UEs, among the UEs, for transmitting the paging message in a PO. The selection is based on at least one of maximum number of UEs supported in a paging record list of the paging message, number of UEs with paging message available with the NB, the estimated candidate CEL value, number of attempts of paging message delivery by the MME to the NB and number of attempts of paging message delivery by the NB to the UEs. The UEs with paging message available with the NB are configured with the same PO. The predefined number of UEs is equal to or less than the maximum number of UEs supported in the paging record list of the paging message. The method includes transmitting the paging message in a physical downlink shared channel (PDSCH) post transmitting a physical downlink control channel (PDCCH) to the predefined number of UEs.

Accordingly embodiments herein provide a method for performing PO monitoring by a UE. The method includes determining allocation of paging frequencies for monitoring a PO. The allocation of paging frequencies is based on CEL values. The method includes performing a mapping of the determined index value of the paging frequency with a frequency position through a mapping function. The method includes monitoring the PO in the mapped frequency position.

Accordingly embodiments herein provide a method for monitoring one of PO and paging frequency by a UE. The method includes determining one of type of services, allocated to the POs, to be rendered by the UE; and type of services, allocated to the paging frequencies, to be rendered by the UE. The method includes monitoring one of the POs and the paging frequencies based on type of services to be rendered by the UE.

Accordingly embodiments herein provide a method for decoding a PDCCH by UEs. The method includes initiating reception of PDSCH post terminating decoding of the PDCCH, based on a number of repetitions of the PDCCH and a scheduled radio resources indicated by the PDCCH. The method further includes determining that a time interval between the termination of decoding of the PDCCH and the initiation of reception of the PDSCH exceeds a predefined threshold. Thereafter, the UE switches from connected mode to sleep mode.

Accordingly embodiments herein provide a method for decoding a PDSCH by UEs. The method includes determining a value of a repetition number of the PDSCH from a decoded PDCCH in a PO configured for the UEs. The method includes determining radio resources scheduled for the PDSCH. The method includes decoding the PDSCH based on the determined repetition number and the scheduled radio resources.

The principal object of the embodiments herein is to provide a method for determining paging occasions (PO) to be monitored by user equipments (UE) in an extended discontinuous reception (eDRX) cycle monitoring paging occasions based on coverage enhancement Level (CEL).

Another object of the embodiments herein is to provide a uniform/non-varying distribution of UEs for monitoring the POs, in the eDRX cycle, which are available for monitoring by the UEs.

Another object of the embodiments herein is to minimize UE power consumption caused due to monitoring and receiving paging messages belonging to other UEs.

Another object of the embodiments herein is to optimize radio resource capacity by allowing a UE to monitor the POs which are addressed specifically to the UE.

Another object of the embodiments herein is to categorize UEs to monitor POs based on CE level (CEL) to minimize unnecessary monitoring of physical downlink control channel (PDCCH) and physical downlink shared channel (PDSCH) with large number of repetitions.

Another object of the embodiments herein is to maximize channel capacity and minimize radio resource wastage by allowing UEs with same CEL value to monitor same POs in a paging cycle.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
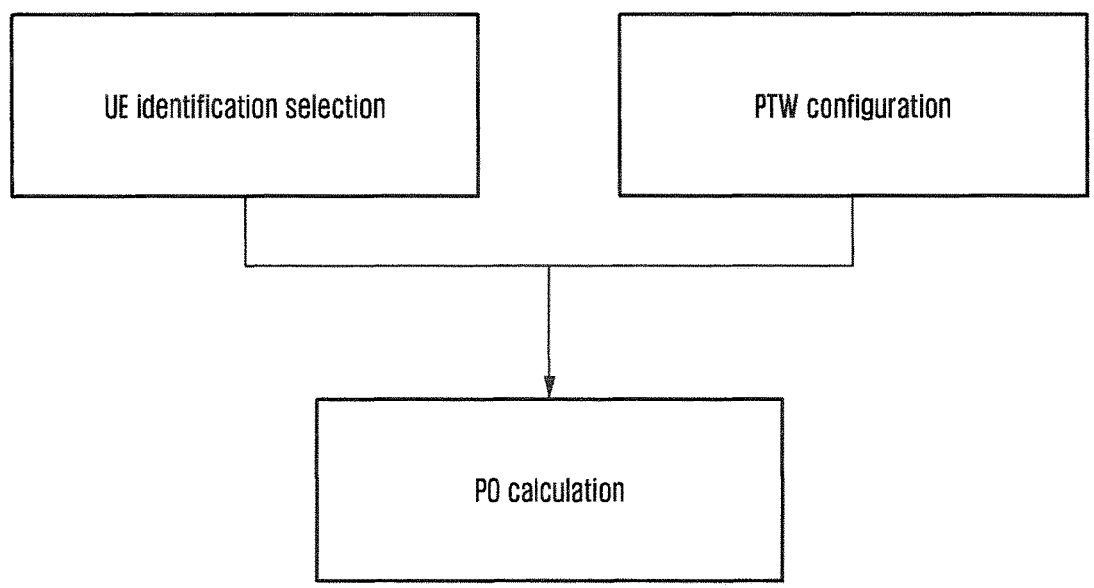
FIG. 1A illustrates an example system block diagram according to the embodiments of the present disclosure.

FIGS. 1A through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication devices.

The term Node B in the draft can refer to either of a NB, an evolved Node B and a G Node B.

Accordingly embodiments herein provide a method for determining paging occasions (PO) in extended discontinuous reception (eDRX) cycle by user equipments (UE). The method includes determining paging hyper-frames (PH) in the eDRX cycle based on estimated values of eDRX UE Identity (UE_ID_H) and number of hyper-frames in an eDRX cycle. The method includes determining a first radio frame of paging transmission window (PTW), in the PH, based on a determined value of PTW offset parameter ($N_{PTW}$) and PTW offset index ($i_{eDRX}$), in which $i_{eDRX}$ is based on the UE_ID_H. The method includes determining a last radio frame of PTW based on the determined first radio frame and length of the PTW, in which the length of the PTW corresponds to a number of frames in the PTW. The method includes determining paging frames (PF) in the PTW, in which the determination is based on the UE_ID. The method includes determining the POs in each of the determined PFs based on an index associated with each of the POs. The index associated with each PO is computed based on the UE_ID, number of frames available for paging in the DRX cycle, and number of sub-frames available for paging in each PF.

Accordingly embodiments herein provide a method for performing PO monitoring by a UE. The method includes determining schedule of POs in radio resources across one of subframes in a paging frame (PF), PFs in a CEL paging cycle and subframes in the CEL paging cycle. The schedule of POs is based on coverage enhancement level (CEL) values. The method includes determining at least one of an index value of a PO in a PF, an index value of a PF in the CEL paging cycle, and an index value of a PO in the CEL paging cycle. The method includes performing a mapping of at least one of the determined index value of the PO in the PF with a subframe number (SN) in the PF, the determined index value of the PF in the CEL paging cycle with a system frame number (SFN), the determined index value of the PO in the CEL paging cycle with a SFN, and the determined index value of the PO in the CEL paging cycle with a SN in a PF in the CEL paging cycle. The performance of mapping is based on mapping functions. The method includes monitoring the PO in the mapped at least one of SN and SFN.

Accordingly embodiments herein provide a method for transmitting a paging message in a current connection establishment procedure by a Node B (NB). The method includes estimating a candidate CEL value of UEs based on at least one of a CEL value received from the UEs in a previous connection establishment procedure, maximum CEL value supported by a cell, number of attempts of paging message delivery by a mobility management entity (MME) to the NB (MME repetition number) and number of attempts of paging message delivery by the NB to the UEs (radio access network (RAN) repetition number). The UEs are camped in a cell. The method includes selecting a predefined number of UEs, among the UEs, for transmitting the paging message in a PO. The selection is based on at least one of maximum number of UEs supported in a paging record list of the paging message, number of UEs with paging message available with the NB, the estimated candidate CEL value, number of attempts of paging message delivery by the MME to the NB and number of attempts of paging message delivery by the NB to the UEs. The UEs with paging message available with the NB are configured with the same PO. The predefined number of UEs is equal to or less than the maximum number of UEs supported in the paging record list of the paging message. The method includes transmitting the paging message in a physical downlink shared channel (PDSCH) post transmitting a physical downlink control channel (PDCCH) to the predefined number of UEs.

The information related to paging configuration, i.e. DRX cycle, CEL based PO scheduling, or the like, are provided by the NB to the UEs using a broadcast message. Using this information and the UEs' operation parameters, the UEs determine the POs in which the NB can transmit the PDCCH for transmitting the paging messages, and starts monitoring the configured PO. Prior to transmitting paging messages in each PO, the NB determines the candidate CEL value for each UE which has to be paged in a particular PO. The candidate CEL value is based on the CEL values reported by the UEs to the NB, the MME repetition number, and the RAN repetition number. The candidate CEL is used for determining the repetition pattern of the PDCCH and the PDSCH.

The NB selects a subset of UEs, among the UEs whose paging message is available with the NB and which are configured to monitor the particular PO. The NB transmits the paging message to only the selected UEs in the PDSCH. The NB transmits a PDCCH message in a PO, if a UE configured to monitor the given PO is required to be paged. The selected UEs search for the PDCCH in the search space configured by the cell in the POs that are monitored by the UEs. If the UEs find a PDCCH message scrambled with P-RNTI in the UEs' configured PO, the UEs determine the repetition number and allocated radio resource for PDSCH transmission. The NB transmits the PDSCH, according to the repetition pattern and scheduled resources indicated by the earlier transmitted PDCCH, to the UEs in the configured PO. The UEs use the information provided by the PDCCH, i.e. repetition pattern and radio resources, to initiate decoding the PDSCH. The UEs decode the paging record in the PDSCH and check if any of the UE_ID in the paging record match with their own respective identities. If the respective identities match, then the UEs can initiate the system access procedure. Else the UEs continue monitoring the configured POs.

Unlike conventional methods, the proposed method allows the UEs to utilize UE_ID_H and UE_ID for monitoring the POs, in which the UE_ID is not dependent on a single identifier. The UE_ID_H and UE_ID are determined not only through IMSI, but through other identifiers such as S-TMSI, TIN, C-RNTI, or the like. This allows uniform and non-varying distribution of number of UEs monitoring the POs to retrieve paging messages across hyper-frames. The uniform and non-varying distribution of number of UEs allows efficient radio resource utilization and reduces delay and the UE power consumption.

Referring now to the drawing and more particularly to FIGS. 1a through 10, where similar reference characters denote corresponding features consistently throughout the figures, there are shown preferred embodiments.

FIG. 1a is a high level overview depicting the proposed method, according to the embodiments of the present disclosure. The proposed method is implemented in a UE. The UE determines the POs, configured by the NB, for monitoring, in order to retrieve the paging messages configured for the UE.

As depicted in FIG. 1a, the UE performs UE identification selection. The UE identification selection involves determining the values of parameters UE_ID_H and UE_ID. The parameters UE_ID_H and UE_ID are used for determining the POs configured by the NB for the UE. The UE performs PTW configuration, in which the UE determines the value of the parameter $N_{PTW}$. The parameter $N_{PTW}$ allows determining first radio frame and the last radio frame of the PTW. Finally, the UE determines the POs which have to be monitored for retrieving the paging messages based on the determined values of UE_ID_H, UE_ID and $N_{PTW}$.

Figure 1B:
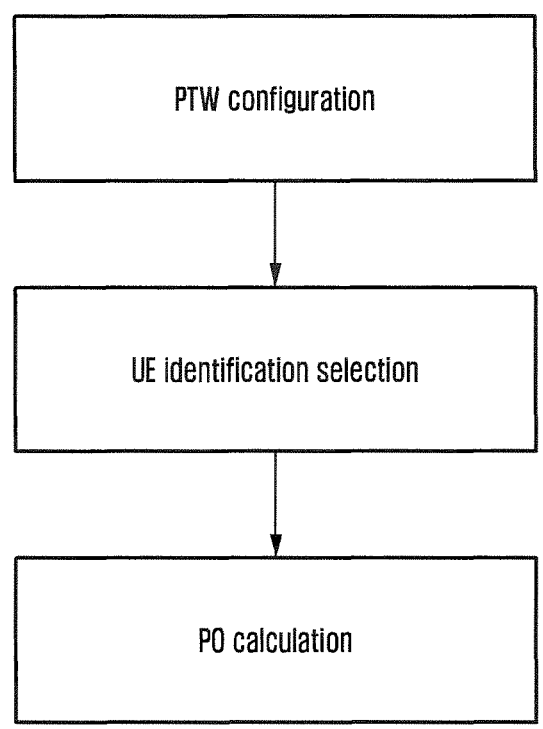
FIG. 1B illustrates another example system block diagram according to the embodiments of the present disclosure.

FIG. 1b illustrates another high level overview depicting the proposed method, according to the embodiments of the present disclosure.

As depicted in FIG. 1b, the UE determines the configured POs in three steps. Initially, the UE determines the value of parameter $N_{PTW}$. Thereafter, the UE determines the values of parameters UE_ID_H and UE_ID. However, the parameter $N_{PTW}$ is utilized for determining the value of UE_ID. Once the values of parameters $N_{PTW}$, UE_ID_H, and UE_ID are determined by the UE; the UE based on these parameters determines the POs which have to be monitored for retrieving the paging messages, broadcasted by the NB.

Figure 2:
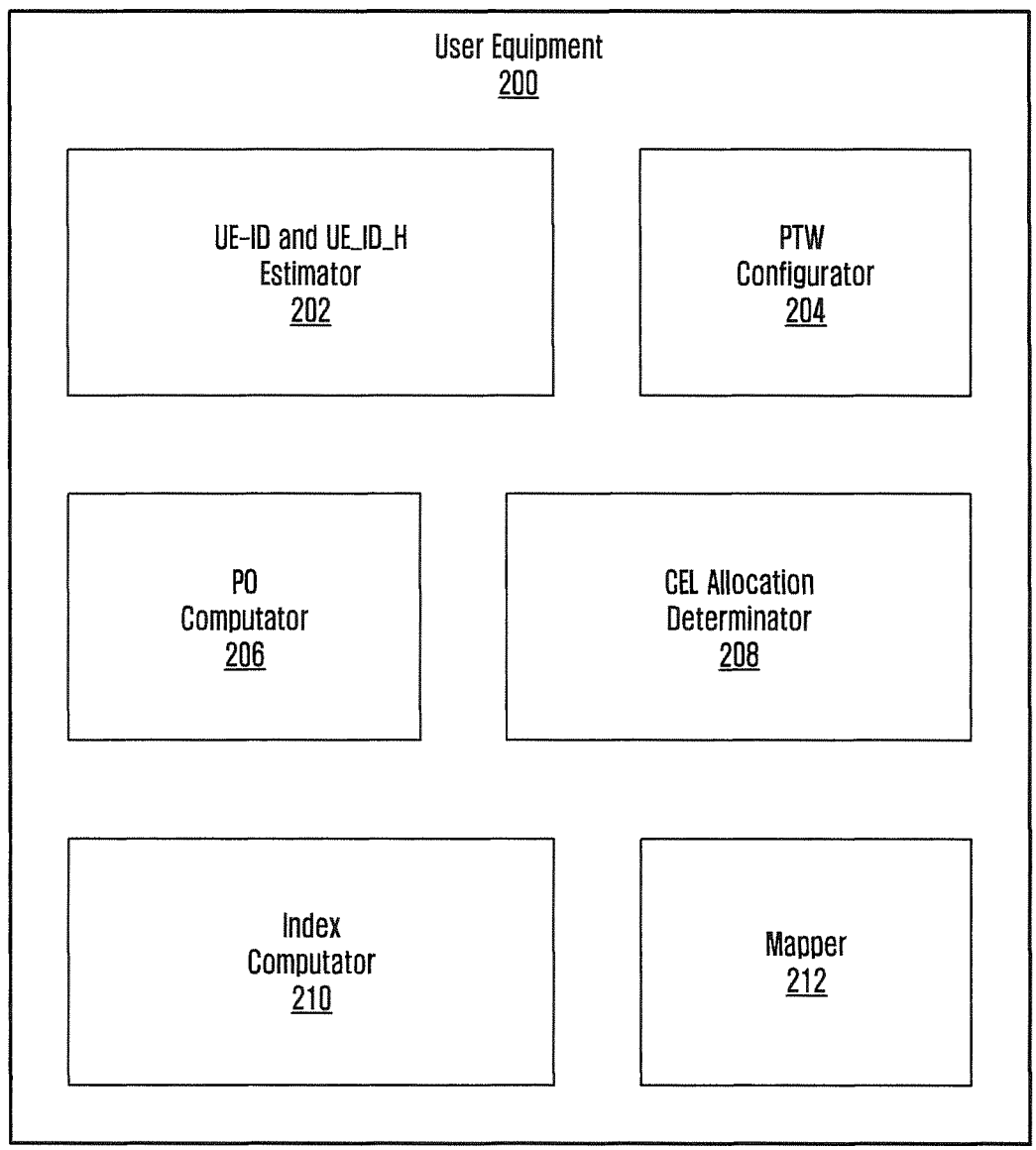
FIG. 2 illustrates an example a user equipment (UE) for determining paging occasions (PO) according to the embodiments of the present disclosure.

FIG. 2 illustrates an example the UE 200 for implementing the proposed method for determining the POs configured for the UE 200, according to the embodiments of the present disclosure. As depicted in FIG. 2, the UE 200 includes a UE_ID and UE_ID_H estimator 202, a PTW configurator 204, a PO computator 206, a CEL allocation determinator 208, an index computator 210 and a mapper 212.

The UE_ID and UE_ID_H estimator 202 estimates the values of UE_ID and UE_ID_H. The values of UE_ID and UE_ID_H are used by the PO computator 206 for computing PO. The proposed method provides solutions which allow the UE_ID and UE_ID_H estimator 202 to estimate the values of UE_ID and UE_ID_H. The solutions and the associated computations will be discussed in detail in FIG. 3a and FIG. 3b. However, in certain solutions (will be discussed in FIG. 3b), for estimating the values of UE_ID and UE_ID_H, it is necessary to determine the value of $N_{PTW}$. For implementing such solutions, the UE_ID and UE_ID_H estimator 202 obtains the $N_{PTW}$ from the PTW configurator 204.

The PTW configurator 204 determines the value of $N_{PTW}$. The value of $N_{PTW}$ is used by the PO computator 206 for computing PO. The value of $N_{PTW}$ is used by the UE_ID and UE_ID_H estimator 202 (in method described in FIG. 3b) for estimating the values of UE_ID and UE_ID_H. The value of $N_{PTW}$ is based on one of: length of the PTW (number of frames in the PTW), system information broadcasted by the NB, and a predefined value.

In an embodiment, the 'length of the PTW' is in seconds, and a variation in range of the 'length of the PTW' results in variation in the value of $N_{PTW}$. The details regarding the variation in the value of $N_{PTW}$ based on the length of the PTW is described in FIG. 3a.

In another embodiment, the value of $N_{PTW}$ is broadcasted by the NB in the system information. The broadcasted values can be 64, 128, 256, 512 and 1024. In yet another embodiment, the predetermined value can be either 64 or 128.

The PO computator 206 determines the POs which are configured by the NB for monitoring by the UE 200. The POs determined by the PO computator 206 are monitored by the UE 200 to retrieve the paging messages which are broadcasted by the NB. Initially, the PO computator 206 determines the PHs in the eDRX cycle which is to be monitored. Thereafter, the PO computator 206 determines the first radio frame and the last radio frame of the PTW. The determination of PHs and, the first and last radio frames of the PTW are based on certain computations carried out by the PO computator 206. The details regarding the computations are described in FIG. 3a.

Once the PHs, and the first radio frame and the last radio frame of the PTW are determined; the PO computator 206 determines the PFs in the PTW. Each PF consists of single or multiple POs. The PO computator 206 determines the POs in each PF, configured for the UE 200, based on an index associated with the PO. The index is associated with the PO is computed based on the UE_ID, number of frames available for paging in the DRX cycle, and number of sub-frames in each PF. The details regarding the computations for obtaining the PFs and the index will be discussed in FIG. 3a.

The CEL allocation refers to scheduling of POs in radio resources, by the NB 400, across subframes in a PF, PFs in a CEL paging cycle, and subframes in the CEL paging cycle. It is to be noted that each PF includes a plurality of subframes, which are associated with POs; and each CEL paging cycle includes a plurality of PFs, which consists of subframes with which the POs are associated. The scheduling of the POs is based on CELs and is performed by the NB 400. The UE 200 determines the schedule of POs allows through the CEL allocation determinator 208.

The scheduling procedure (CEL allocation) is different based on whether the scheduling procedure is present in SI. When the scheduling procedure is present in the SI, the following embodiments are determined by the CEL allocation determinator 208.

In an embodiment, the POs are scheduled across subframes of each PF by categorizing the subframes into a predefined number of CELs. The categorization is based on the estimation of candidate CELs of the UEs. The UEs (200) falling within a particular CEL, monitor POs in the subframes categorized with a particular CEL. Each of the subframes of the PF is associated with an index value ($i_s$). In another embodiment, the POs are scheduled across PFs by categorizing the PFs into a predefined number of CELs. The UEs (200) falling within a particular CEL monitor PFs, in the CEL paging cycle, categorized with a particular CEL. Each of the PFs in the CEL paging cycle is associated with an index value ($i_f$).

In another embodiment, each cell paging cycle is categorized with into a predefined number of CELs. The UEs (200) falling within a particular CEL monitor POs, in the CEL paging cycle, categorized with a particular CEL. Each of the POs in the CEL paging cycle is associated with an index value ($i_t$). The index value ($i_t$) can be used for computing the index value ($i_f$) and the index value ($i_s$).

When the scheduling procedure is not present in the SI, the CEL allocation determinator 208 determines the following embodiments of the scheduling procedure. In an embodiment, when the POs are scheduled in the subframes of one PF, the scheduling of the POs in the PF is based on the number of POs in the PF, highest CEL value supported by the cell and lowest CEL supported by the cell. In another embodiment, when the POs are scheduled across PFs in the CEL paging cycle; the scheduling of the PFs in the CEL paging cycle is based on the number of PFs in the CEL paging cycle, highest CEL supported by the cell, and the lowest CEL value supported by the cell. In yet another embodiment, when the POs are scheduled across subframes in the cell paging cycle; the scheduling of the POs in the CEL paging cycle is based on the number of POs in each CEL paging cycle, highest CEL supported by a cell, and lowest CEL value supported by the cell.

The index computator 210 determines the above mentioned index values of the POs and PFs by computing the index values using the following embodiments. In an embodiment, the method allows the index computator 210 to compute the index value ($i_s$) of each PO associated with each subframe, in the PF. The computation of $i_s$ is based on number of POs allocated to each CEL, UE_ID and number of frames available for paging in a single DRX cycle.

In another embodiment, the method allows the index computator 210 to compute the index value ($i_f$) of each PF in the CEL paging cycle. The computation of $i_f$ is based on the UE_ID, number of PFs in a single CEL paging cycle, number of PFs allocated to each CEL and number of frames available for paging in a single DRX cycle. In yet another embodiment, the method allows the index computator 210 to compute the index value ($i_t$) of each PO associated with each subframe in the CEL paging cycle. The computation of it is based on number of POs allocated to each CEL, UE_ID, number of PFs in a single CEL paging cycle and number of frames available for paging in a single DRX cycle.

The method allows the index computator 210 to compute the index value ($i_f$) and the index value ($i_s$), using the computed index value ($i_t$). Here ($i_s$) is based on it and number of POs in a single PF and if is based on it and the number of POs in a single PF.

The computed index values are used for determining the SN and the SFN to be monitored by the UE 200 for retrieving the paging messages. The determination of the SN and the SFN is based on mapping functions.

The mapper 212 performs PO scheduling. The PO scheduling refers to mapping the determined index values to either a SN or a SFN. The mappings are performed through the mapping functions using the determined index values viz., $i_s$, $i_f$, and $i_t$. The UE 200 determines whether the mapping function is present in the SI. The mapper 212 determines whether the PF scheduling is included in the SI by determining whether the mapping functions are present in the SI. When the mapping functions are present in the SI, the following mapping embodiments are performed by the mapper 212.

In an embodiment, the method allows the mapper 212 to perform mapping of the determined $i_s$ with a SN in the PF, using the mapping function [SN=posSN($i_s$)]. In another embodiment, the method allows the mapper 212 to perform mapping of the determined $i_f$ with a SFN using the mapping function [SFN=SFN$_{start}$+offsetSFN($i_f$)]. In another embodiment, the method allows the mapper 212 to perform mapping of the determined $i_t$ with a SFN, using the mapping function [SFN=SFN$_{start}$+offsetSFN($i_t$)]. In yet another embodiment, the method allows the mapper 212 to perform mapping of the determined $i_t$ with a SN in a PF in the CEL paging cycle, using the mapping function [SN=posSN($i_t$)]. Each of the mappings are based on each mapping function viz. posSN($i_s$), offsetSFN($i_f$), offsetSFN($i_t$) and posSN($i_t$).

When the mapping functions are not present in the SI, the following mapping embodiments are performed by the mapper 212.

In another embodiment, when the POs are scheduled across PFs in the CEL paging cycle; the mapping function, offsetSFN($i_f$), for mapping the if with a SFN is based on if, length of DRX cycle in radio frames and number of frames available for paging in a single DRX cycle.

In another embodiment, when the POs are scheduled across subframes in the cell paging cycle; the mapping function for mapping $i_t$ with a SFN is based on $i_t$, length of DRX cycle in radio frames, number of POs in a single PF, and number of frames available for paging in a single DRX cycle. In another embodiment, when the POs are scheduled across subframes in the CEL paging cycle; the mapping function for mapping $i_f$ with a SFN is based on $i_f$, length of DRX cycle in radio frames and number of frames available for paging in a single DRX cycle. It is to be noted that $i_f$ in this embodiment is obtained through $i_t$.

FIG. 2 illustrates an example the UE 200 but it is to be understood that other embodiments are not limited thereto. The labels or names of the units are used only for illustrative purpose and does not limit the scope of the invention. Further, the UE 200 can include any number of units or sub-units communicating among each other along with the other components. Likewise, the functionalities of one or more units can be combined by a single unit or can be distributed among each other in a manner different than described herein without departing from the scope of the invention. For example, the UE 200 may comprise a transceiver and a controller to control the overall operation thereof. The transceiver may transmit and receive a signal to and from other network entities (ex. base station, MME, etc.). The controller may control the UE to perform a function according to one of the embodiments described before and after. The controller and the transceiver may be realized as a single entity like a single chip. The controller and the transceiver may be electrically connected to each other. The controller may be a circuit, an application-specific circuit, or a processor. The UE operations may be implemented using a memory unit storing corresponding program codes. Specifically, the UE may be equipped with a memory unit to store program codes implementing desired operations, and the controller may read and execute the program codes stored in the memory unit.

Figure 3A:
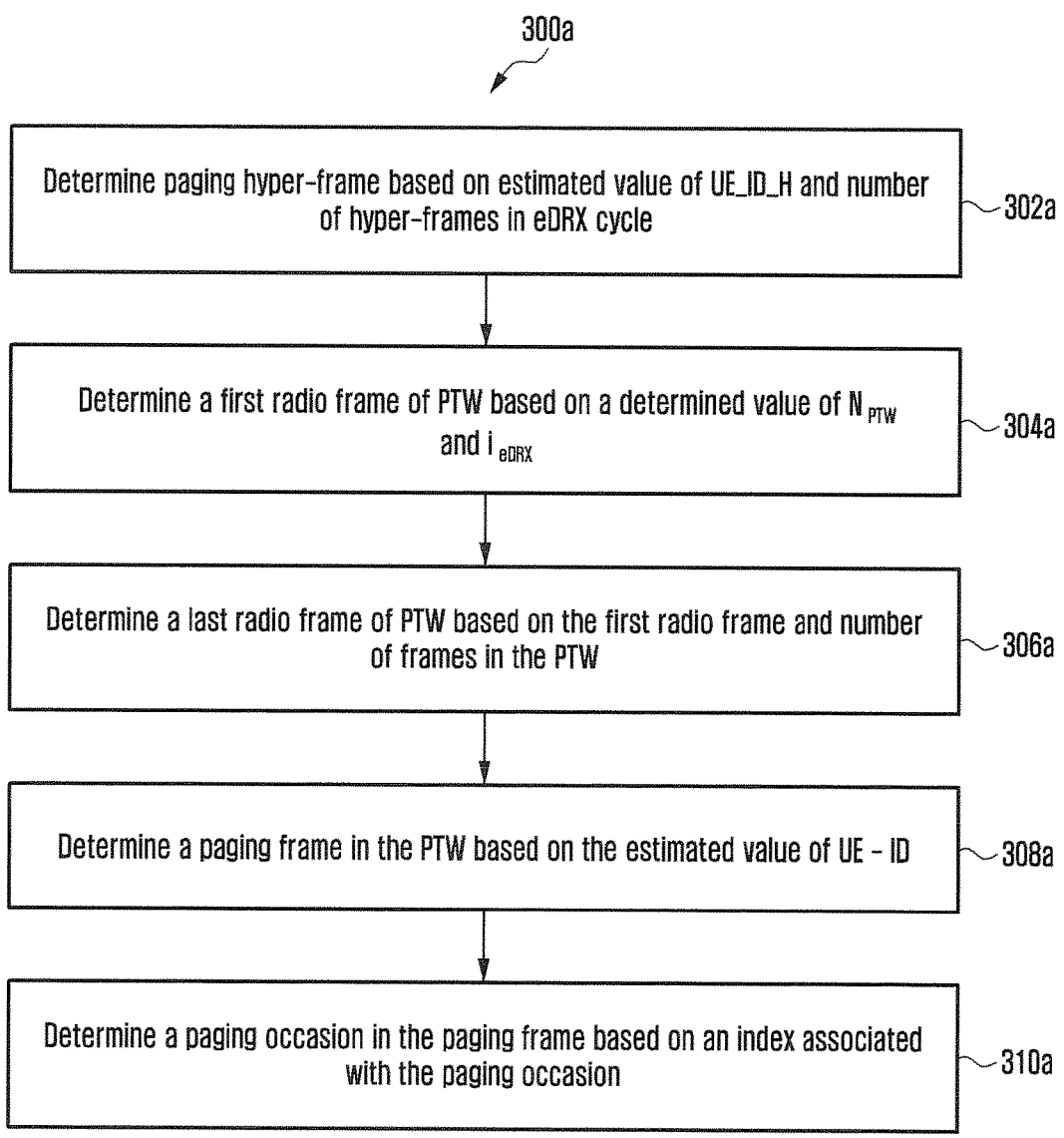
FIG. 3A illustrates a flowchart of a method for determining POs according to the embodiments of the present disclosure.

FIG. 3a illustrates a flowchart 300a depicting the method for determining POs configured for the UE 200 according to the embodiments of the present disclosure.

At step 302a, the method includes determining PHs based on estimated value of UE_ID_H and number of hyperframes in the eDRX cycle. The method allows the UE_ID and UE_ID_H estimator 202 to perform the estimation. The estimation of UE_ID and UE_ID_H is known as UE identification selection. The embodiments (solutions) for determining the UE_ID_H and UE_ID, for identification of the UE 200 are as follows:

In some embodiments, the method allows the UE_ID and UE_ID_H estimator 202 to compute the UE_ID based on the International Mobile Subscriber Identity (IMSI) of the UE 200. The value of UE_ID is computed as:

UE_ID=IMSI mod 1024

The method allows the UE_ID and UE_ID_H estimator 202 to compute the UE_ID_H based on an identifier X. The value of UE_ID_H is computed as:

UE_ID_H=X mod 1024

Here, X is an identifier, relevant to the UE 200, which can be used by the NB and/or the mobility management entity (MME) to address the UE 200 in a cellular network. The identifier X cannot be the IMSI. X can be any one of the identifiers which includes: system architecture evolution-temporary mobile subscriber identity (S-TMSI), mobile subscriber identity number (MSIN), mobility management entity-TMSI (M-TMSI), globally unique temporary ID (GUTI), temporary identity number (TIN), cell-radio network temporary identifier (C-RNTI), and international mobile equipment identity (IMEI). It is to be noted that X is not restricted only to the above mentioned identifiers and any other identifier of the UE 200 can be used for substituting the value of X.

In some embodiment, the method allows the UE_ID and UE_ID_H estimator 202 to compute the UE_ID_H based on the IMSI. The value of UE_ID_H is computed as:

UE_ID_H=IMSI mod 1024

The method allows the UE_ID and UE_ID_H estimator 202 to compute the UE_ID based on an identifier X. The value of UE_ID is computed as:

UE_ID=X mod 1024

Here, X is an identifier, relevant to the UE 200, which can be used by NB and/or MME to address the UE 200 in a cellular network. The identifier X cannot be the IMSI. X can be any one of the identifiers which includes: S-TMSI, MSIN, M-TMSI, GUTI, TIN, C-RNTI, and IMEI. It is to be noted that X is not restricted only to the above mentioned identifiers and any other identifier can be used for substituting the value of X.

In some embodiments, the method allows the UE_ID and UE_ID_H estimator 202 to compute the UE_ID based on the IMSI. The value of UE_ID is computed as:

UE_ID=IMSI mod 1024

The method allows the UE_ID and UE_ID_H estimator 202 to compute the UE_ID_H based on the computed UE_ID and an identifier X. The value of UE_ID_H is computed as:

UE_ID_H=UE_ID+X mod 1024

Here, X is an identifier, relevant to the UE 200, which can be used by NB and/or MME to address the UE 200 in a cellular network. The identifier X cannot be the IMSI. X can be any one of the identifiers which includes: S-TMSI, MSIN, M-TMSI, GUTI, TIN, C-RNTI, and IMEI. It is to be noted that X is not restricted only to the above mentioned identifiers and any other identifier can be used for substituting the value of X.

In some embodiments, the method allows the UE_ID and UE_ID_H estimator 202 to compute the UE_ID_H based on the IMSI. The value of UE_ID_H is computed as:

UE_ID_H=IMSI mod 1024

The method allows the UE_ID and UE_ID_H estimator 202 to compute UE_ID based on the computed UE_ID_H and an identifier X. The value of UE_ID is computed as:

UE_ID=UE_ID_H+X mod 1024

Here, X is an identifier, relevant to the UE 200, which can be used by the NB and/or MME to address the UE 200 in a cellular network. The identifier X cannot be the IMSI. X can be any one of the identifiers which includes: S-TMSI, MSIN, M-TMSI, GUTI, TIN, C-RNTI, and IMEI. It is to be noted that X is not restricted only to the above mentioned identifiers and any other identifier can be used for substituting the value of X.

In some embodiments, the method allows the UE_ID and UE_ID_H estimator 202 to compute the UE_ID based on the IMSI. The value of UE_ID is calculated as:

UE_ID=IMSI mod 1024

The method allows the UE_ID and UE_ID_H estimator 202 to compute the UE_ID_H based on the IMSI and a predefined value $N_e$. The value of UE_ID_H is computed as:

UE_ID_H=(IMSI/$N_e$)mod 1024

The value of $N_e$ is a constant and is a power of 2. In an example, the value of $N_e$ can be any one of the values: 256, 512, 1024, 2048, and 4096.

In some embodiment, the method allows the UE_ID and UE_ID_H estimator 202 to compute the UE_ID based on the IMSI. The value of UE_ID is computed as:

UE_ID=IMSI mod 1024

The method allows the UE_ID and UE_ID_H estimator 202 to compute the UE_ID_H based on the IMSI and a predefined value $N_e$. The predefined value is based on number of frames available for paging in the DRX cycle, i.e., N, and number of sub-frames available for paging in a PF, i.e., $N_S$. The value of UE_ID_H is computed as:

UE_ID_H=(IMSI/$N_e$)mod 1024

The predefined value $N_e$ is computed as:

$N_e = N*N_s$

If T is the DRX cycle in system frames, then N=min (T, nB) and $N_s$=max (1, nB/T), in which nB can be any value belonging to the set {4T, 2T, T, T/2, T/4, T/8, T/16, T/32}.

In some embodiments, the method allows the UE_ID and UE_ID_H estimator 202 to compute the UE_ID based on the IMSI. The value of UE_ID is computed as:

UE_ID=IMSI mod 1024

The method allows the UE_ID and UE_ID_H estimator 202 to compute the UE_ID_H based on the IMSI and number of frames available for paging in the DRX cycle, i.e., N. The value of UE_ID_H is computed as:

UE_ID_H=(IMSI/N)mod 1024

If T is the DRX cycle in system frames, then N=min (T, nB), in which nB can be any value belonging to the set {4T, 2T, T, T/2, T/4, T/8, T/16, T/32}.

In some embodiments, the method allows the UE_ID and UE_ID_H estimator 202 to compute the UE_ID_H based on the IMSI. The value of UE_ID_H is computed as:

UE_ID_H=IMSI mod 1024

The method allows the UE_ID and UE_ID_H estimator 202 to compute the UE_ID based on the IMSI and a predefined value $N_e$. The value of UE_ID is computed as:

UE_ID=(IMSI/$N_e$)mod 1024

The predefined value $N_e$ is a constant and is a power of 2. In an example, $N_e$ can be any one of the values such as, 256, 512, 1024, 2048, and 4096.

In some embodiment, the method allows the UE_ID and UE_ID_H estimator 202 to compute the UE_ID_H based on the IMSI. The value of UE_ID_H is computed as:

UE_ID_$H$=IMSI mod 1024

The method allows computing UE_ID based on an identifier X, signaled received from the Mobility Management Entity (MME) during Tracking Area Update (TAU) procedure. The value of UE_ID is computed as:

UE_ID=$X$ mod 1024

The identifier X can be provided by the MME to the UE 200 using Non-Access Stratum (NAS) signaling.

In some embodiments, the method allows the UE_ID and UE_ID_H estimator 202 to compute the UE_ID based on the IMSI. The value of UE_ID is computed as:

UE_ID=IMSI mod 1024

The method allows the UE_ID and UE_ID_H estimator 202 to compute the UE_ID_H based on an identifier X, signaled from the MME during the TAU procedure. The value of UE_ID_H is computed as:

UE_ID_$H$=$X$ mod 1024

The identifier X can also be provided by the MME to the UE 200 using NAS signaling.

The UE 200 is configured by the upper layers with an eDRX cycle time of $T_{eDRX,H}$ if the cell indicates support for eDRX in the system information. Once, UE_ID and UE_ID_H are determined by the UE_ID and UE_ID_H estimator 202, the PHs, which are to be monitored by UE 200, are determined based on UE_ID_H and number of hyper-frames in the eDRX cycle. The system frame number of the PHs are determined through the following equation:

$H$-SFN mod $T_{eDRX,H}$=(UE_ID_$H$ mod $T_{eDRX,H}$)

here, $T_{eDRX,H}$ is the eDRX cycle time of the UE 200 in hyper-frames and UE_ID_H is as determined from the solutions discussed above.

At step 304a, the method includes determining a first radio frame of the PTW based on the determined value of $N_{PTW}$ and $i_{eDRX}$. The proposed method determines the first radio frame of the PTW based on the values of $N_{PTW}$ and $i_{eDRX}$. The values of $N_{PTW}$ and $i_{eDRX}$ re determined through the PTW configurator 204. The determination of $N_{PTW}$ and $i_{eDRX}$ is referred to as PTW configuration.

The embodiments (solutions) for determining value of the parameter $N_{PTW}$ are as follows:

In some embodiments, the method allows the PTW configurator 204 to determine the value of $N_{PTW}$ based on the length (L) of the PTW. The length of the PTW is indicated in seconds and refers to the number of frames in the PTW. The variation of $N_{PTW}$ with respect to L is as follows:
If L<1.28 sec, then $N_{PTW}$=64.
Else if 1.28 sec<L<2.56 sec, then $N_{PTW}$=128.
Else if 2.56 sec<L<5.12 sec, then $N_{PTW}$=256.
Else if 5.12 sec<L<10.24 sec, then $N_{PTW}$=512.
Else if L>10.24 sec, then $N_{PTW}$=1024.

In some embodiments, the method allows the PTW configurator 204 to determine the value of $N_{PTW}$ based on the value indicated in the system information. The value of $N_{PTW}$ (in system frame numbers) is broadcasted to the UE 200 by the NB in the system information and can have any one of the values in the set: {64, 128, 256, 512, 1024}.

In some embodiments, the value of $N_{PTW}$ is predetermined. The predetermined value is 64.

In some embodiments, the value of $N_{PTW}$ is predetermined. The predetermined value is 128.

The $i_{eDRX}$ is based on the UE_ID_H and the $N_{PTW}$, which are determined through the above solutions. The $i_{eDRX}$ is determined as follows:

$i_{eDRX}$=floor(UE_ID_$H$/$T_{eDRX,H}$)mod(1024/$N_{PTW}$)

PTW configuration involves determining the first radio frame and the last radio frame of the PTW, belonging to a particular PH, to be monitored by the UE 200. The PW-start denotes the first radio frame of the PTW, which is in turn a part of the PH. The system frame number of the first radio frame satisfies the following equation:

PW-start=$N_{PTW}$*$i_{eDRX}$

At step 306a, the method includes determining the last radio frame of the PTW based on the first radio frame and number of frames in the PTW. The PW-end denotes the last radio frame of the PTW, which is in turn a part of the PH. The system frame number of the last radio frame of the PTW satisfies the following equation:

PW-end=(PW-start+$L$*100−1)mod 1024, here, L is the length of the PTW (in seconds) configured by the upper layers. As indicated in the equation, the system frame number of the PW-end is based on the system frame number of the PW-start.

At step 308a, the method includes determining PFs in the PTW based on the estimated value of UE_ID. The method allows the PO computator 206 to determine the PFs, in the PTW, to be monitored by the UE 200.

Within the PTW, the UE 200 monitors the PFs with system frame numbers which satisfy the following equation:

SFN mod $T$=($T$ div $N$)*(UE_ID mod $N$)

here, the SFN is the frame number of the PF, in the PTW, to be monitored by the UE 200.

At step 310a, the method includes determining POs in the determined PFs based on an index associated with each PO. The PF may consist of a single or a plurality of POs. Once, the UE 200 determines the UE_ID_H, UE_ID, and $N_{PTW}$; the proposed method allows the PO computator 206 to determine the configured POs, which are to be monitored, in order to retrieve the paging messages broadcasted by the NB. The PO computator 206 determines the POs in the PFs based on a computation. The index associated with the PO is computed based on the UE_ID, number of frames available for paging in the DRX cycle, and number of sub-frames available for paging in each PF.

The index $i_s$ associated with the PO, configured for the UE 200, from sub-frame pattern is derived using the equation:

$i_s$=floor(UE_ID/$N$)mod $N_s$ here, UE_ID is as determined from step 302a, and T is the DRX cycle in system frames.

The utilization of UE_ID, UE_ID_H, and $N_{PTW}$ values for determining the POs allow uniform and non-varying distribution of number of UEs, monitoring the POs, for retrieving the respective paging messages. This allows efficient utilization of radio resources and minimizes power consumption of all the UEs.

The various actions, acts, blocks, steps, or the like in the flowchart 300a may be performed in the order presented, in a different order or simultaneously. Further, in some embodiments, some of the actions, acts, blocks, steps, or the like may be omitted, added, modified, skipped, or the like without departing from the scope of the invention. The method and other description provide a basis for a control program, which can be easily implemented by a microcontroller, microprocessor, or a combination thereof.

Figure 3B:
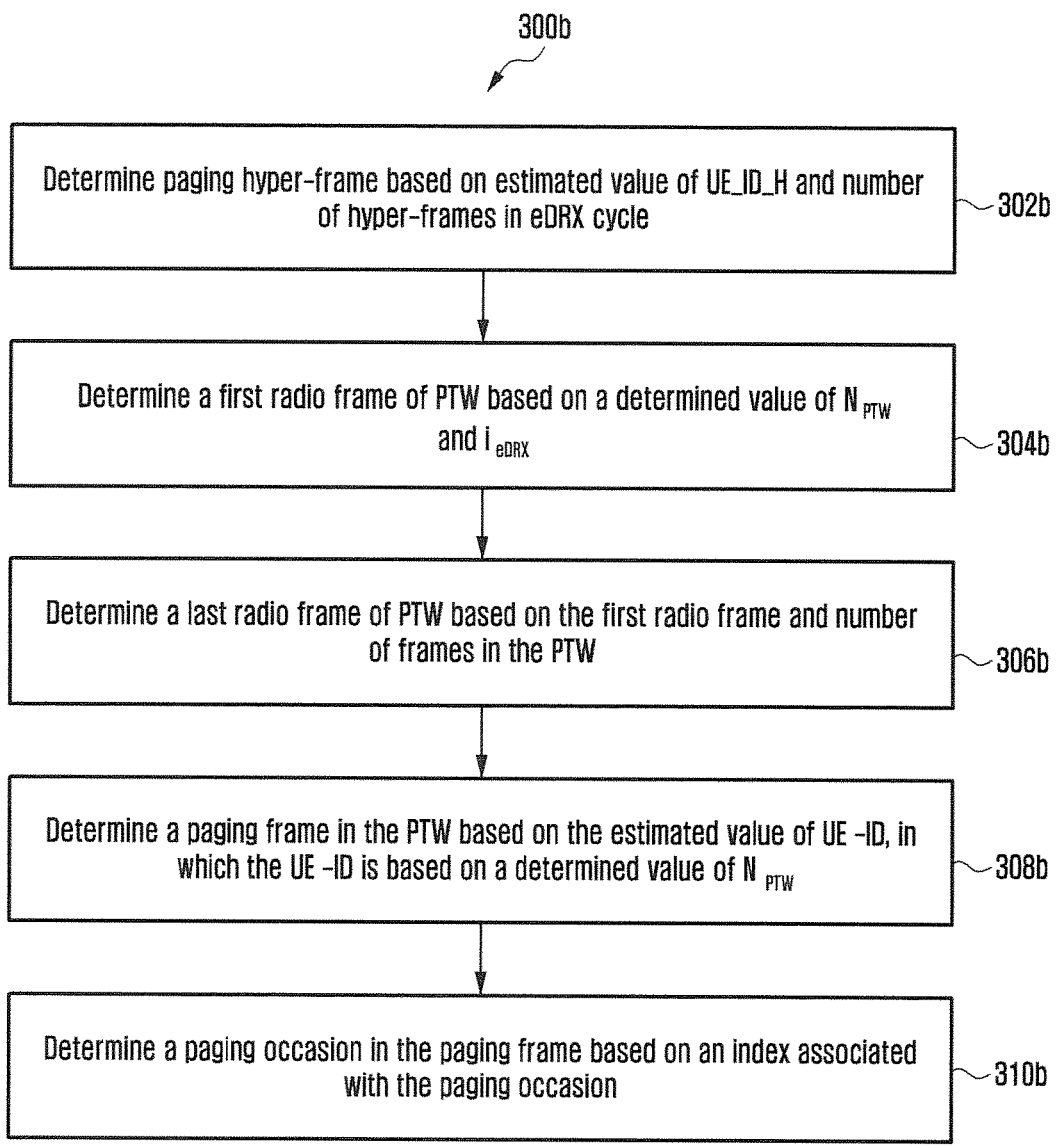
FIG. 3B illustrates another flowchart of a method for determining POs according to the embodiments of the present disclosure.

FIG. 3b illustrates another flowchart 300b depicting the method for determining the POs configured for the UE 200 according to the embodiments of the present disclosure.

At step 302, the method includes determining PHs based on estimated value of UE_ID_H and number of hyperframes in the eDRX cycle. The solutions for estimating the value of UE_ID_H will be described in step 308b. However, the procedure for determining the PHs, post estimation of the value of UE_ID_H, is identical to that described in step 302a of the flowchart 300a.

For the sake of brevity, the description for the steps 304b-306b is not included here. However, the functionalities executed by the steps 304b-306b remain same as that of 304a-306a in the flowchart 300a.

At step 308, the method includes determining PFs in the PTW based on the estimated value of UE_ID, in which the UE_ID is based on the determined value of $N_{PTW}$.

The method allows the UE_ID and UE_ID_H estimator 202 to determine the values of parameters UE_ID_H and UE_ID. However, estimating the value of UE_ID requires determining the value of $N_{PTW}$. The embodiments (solutions) for determining the UE_ID_H and UE_ID, for UE identification are as follows:

In some embodiments, the method allows the UE_ID and UE_ID_H estimator 202 to estimate the value of UE_ID_H based on the IMSI of the UE 200. The value of UE_ID_H is computed as:

UE_ID_$H$=IMSI mod 1024

The method allows the UE_ID and UE_ID_H estimator 202 to estimate the UE_ID based on the IMSI and a predetermined number. The predetermined number ($N_e$) is based on the value of $N_{PTW}$ and a predefined number.

The predetermined number $N_e$ is defined as:

$N_e=N_{PTW}*1024$

The predefined number in this embodiment is 1024.
The value of UE_ID is computed as:

UE_ID=(IMSI/$Ne$)mod 1024.

In some embodiments, the method allows the UE_ID and UE_ID_H estimator 202 to estimate the UE_ID_H based on the IMSI of the UE 200. The value of UE_ID_H is computed as:

UE_ID_$H$=IMSI mod 1024

The method allows the UE_ID and UE_ID_H estimator 202 to estimate the UE_ID based on the IMSI and a predetermined number. The predetermined number ($N_e$) is based on the value of $N_{PTW}$ and a predefined number.

The predetermined number $N_e$ is defined as:

$N_e=N_{PTW}*512$

The predefined number in this embodiment is 512.
The value of UE_ID is computed as:

UE_ID=(IMSI/$N_e$)mod 1024.

Once the values of parameters $N_{PTW}$, UE_ID_H, and UE_ID are determined by the UE 200 through the various units; the UE 200 determines the POs, which have to be monitored for retrieving the paging messages, broadcasted by the NB.

For the sake of brevity, the description for the step 310b is not included here. However, the functionalities executed by the step 310b remains same as that of 310a in the flowchart 300a.

The various actions, acts, blocks, steps, or the like in the flowchart 300b may be performed in the order presented, in a different order or simultaneously. Further, in some embodiments, some of the actions, acts, blocks, steps, or the like may be omitted, added, modified, skipped, or the like without departing from the scope of the invention. The method and other description provide a basis for a control program, which can be easily implemented by a microcontroller, microprocessor, or a combination thereof.

Figure 4:
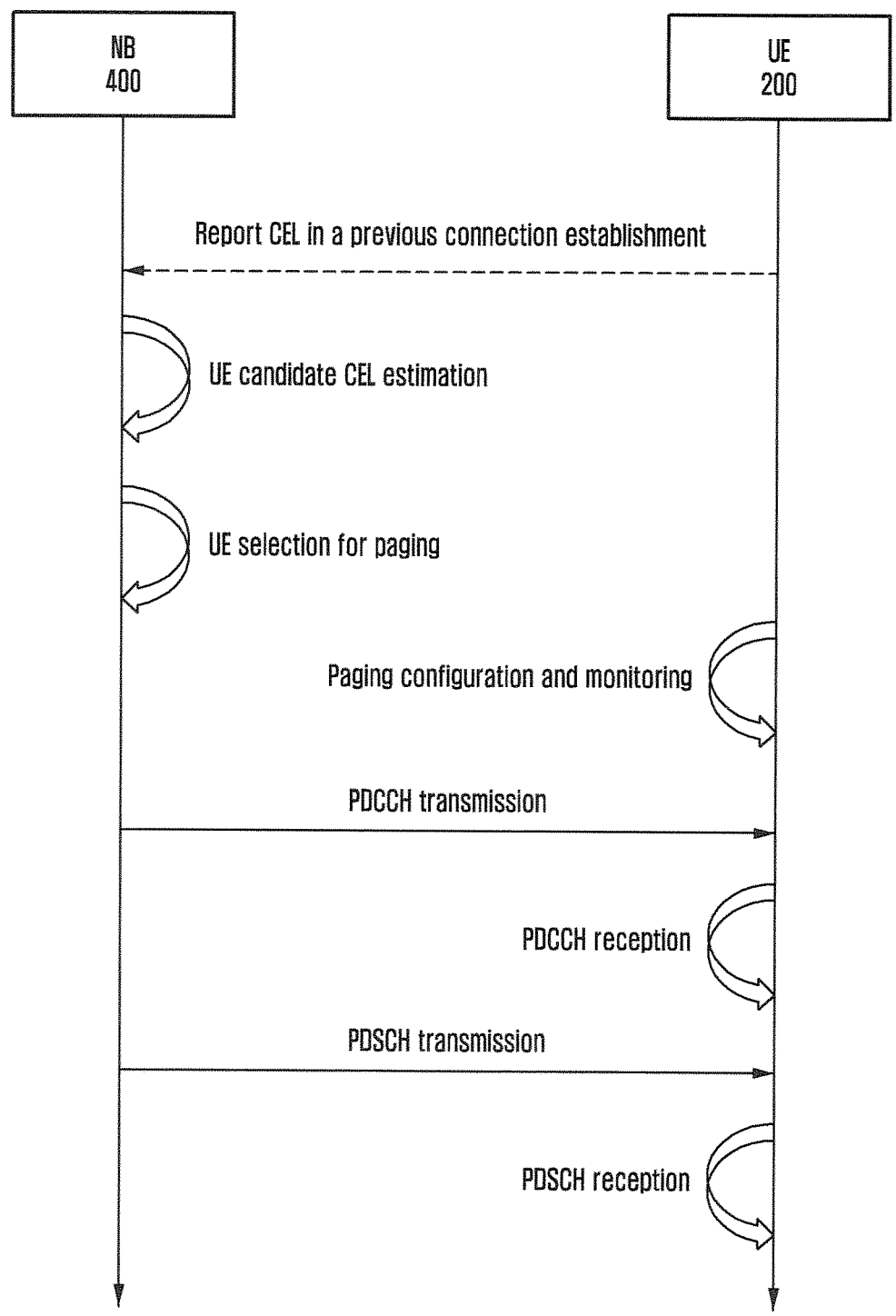
FIG. 4 illustrates an example coverage enhancement level (CEL) based paging procedure according to the embodiments of the present disclosure.

FIG. 4 illustrates an example CEL based paging procedure, according to the embodiments as disclosed herein. As depicted in FIG. 4, the proposed CEL paging procedure involves actions performed by both NB 400 and UE 200, in which the performance of each action is based on the inputs received from either NB 400 or UE 200. Initially, the NB estimates the candidate CEL value of the UE 200. In order to determine the candidate CEL value, the NB 400 needs to obtain CEL value determined by the UE 200 in a previous connection establishment. As such, the UE 200 reports the CEL value to the NB 400. It is to be noted that if multiple UEs (200) establish connection with the NB 200, then the NB 400 determines the candidate CEL value of each of the UEs (200) by receiving the CEL values determined by all the UEs (200) in the previous connection establishment. For simplifying the description, the estimation of candidate CEL value for one UE 200 is described herein. The candidate CEL value is determined based on the CEL value reported by the UE 200 during the previous connection establishment ($C_{UE}$), maximum CEL value supported by the cell ($C_{UEMax}$), number of attempts of paging message delivery by the MME to the NB 400 ($N_{MME}$), number of attempts of paging message delivery by the NB 400 to the UE 200 ($N_{RAN}$). The value of $N_{MME}$ and $N_{RAN}$ can be 0, 1, 2, 3, 4, 5, or the like The embodiments for estimating the candidate CEL value are described as follows:

In an embodiment, the candidate CEL value ($C'_{UE}$) of the UE 200 is computed as follows:

$C'_{UE}=\min\{C_{MAX}, C_{UE}+k_{MME}*N_{MME}+k_{RAN}*N_{RAN}\}$

Here, $k_{RAN}$ and $k_{MME}$ are constants, and is selected by the NB 400; the function min {a, b} returns the minimum value between 'a' and 'b'.

In another embodiment, the candidate CEL value ($C'_{UE}$) of the UE 200 is computed as follows:

If $N_{MME}$ is equal to 0, then the candidate CEL value ($C'_{UE}$) of the UE 200 is computed as follows:

$C'_{UE}=\min\{C_{MAX}, C_{UE}+k_{RAN}*N_{RAN}\}$

Else: $C'_{UE}=C_{MAX}$.

Here, $k_{RAN}$ and $k_{MME}$ are constants and selected by the NB 400; the function min {a, b} returns the minimum value between 'a' and 'b'.

In yet another embodiment, the candidate CEL value ($C'_{UE}$) of the UE 200 is computed as: $C'_{UE}=C_{UE}$.

Once, the NB 400 computes the candidate CEL value, the NB 400 performs selection of UEs (200) for transmitting the paging message in a PO. The paging record list is having a certain capacity, which allows the NB 400 to transmit paging message to only a predefined number of UEs (200), among all UEs (200), which are configured to monitor a particular PO.

The NB 400 selects the UEs (200) for transmitting the paging message based on maximum number of UEs (200)

supported in a paging record list of the paging message ($N_{MAX}$), number of UEs (200) with paging message available with the NB 400 which are configured with the same PO ($N_{UE}$), the estimated candidate CEL value of the UEs (200), $N_{MME}$ and $N_{RAN}$. It is to be noted that the predefined number of UEs (200) selected by the NB 400 to transmit the paging message is either equal to or less than $N_{MAX}$. If $N_{UE}$ is less than $N_{MAX}$, then $N_{UE}$ is equal to the predefined number of UEs (200) selected by the NB 400 to transmit the paging message. On the other hand if $N_{UE}$ is greater than $N_{MAX}$, then $N_{MAX}$ is equal to the predefined number of UEs (200) selected by the NB 400 to transmit the paging message.

The embodiments for selecting the UEs (200) for transmitting the paging message are described as follows:

In an embodiment, the UEs (200) to be paged in a PO are selected as follows: 1) If $N_{UE}$ for the given PO is less than $N_{MAX}$, then all $N_{UE}$ UEs (200) are selected for transmitting the paging message; 2) Else the following actions are performed: (1) the $N_{UE}$ UEs (200) are sorted according to the $N_{RAN}$ in a decreasing order; and (2) the first $N_{MAX}$ UEs (200) are selected.

In another embodiment, the UEs (200) to be paged in a PO are selected as follows: 1) if $N_{UE}$ for the given PO is less than $N_{MAX}$, all $N_{UE}$ UEs (200) are selected for transmitting the paging message; 2) Else the following actions are performed: (1) the $N_{UE}$ UEs (200) are sorted according to the $N_{MME}$ and thereafter $N_{RAN}$ in a decreasing order; (2) The first $N_{MAX}$ UEs (200) are selected.

In another embodiment, the UEs (200) to be paged in a PO are selected as follows: 1) If $N_{UE}$ for the given PO is less than $N_{MAX}$, all $N_{UE}$ UEs (200) are selected for transmitting the paging message; and 2) Else the following actions are performed: (1) the $N_{UE}$ UEs (200) are sorted according to the candidate CEL value computed by the NB 400 in a decreasing order; (2) the first $N_{MAX}$ UEs (200) are selected.

In yet another embodiment, the UEs (200) to be paged in a PO are selected as follows: 1) if $N_{UE}$ for the given PO is less than $N_{MAX}$, all $N_{UE}$ UEs (200) are selected for transmitting the paging message; and 2) else the following actions are performed: (1) the $N_{UE}$ UEs (200) are sorted according to the candidate CEL value computed by the NB 400 in an increasing order; and (2) the first $N_{MAX}$ UEs (200) are selected.

Once, the NB 400 completes the selection procedure, the selected UEs (200) perform paging configuration and monitoring. For simplifying the description, the paging configuration and monitoring performed by one UE 200 is described herein. The UE 200 determines the schedule of POs in radio resources. The NB 400 can perform the scheduling across subframes in a PF, PFs in a CEL paging cycle, and subframes in the CEL paging cycle. As discussed, the schedule of POs is based on CEL value of the UE 200.

The UE 200 determines an index value of a PO in a PF, an index value of a PF in the CEL paging cycle, and an index value of a PO in the CEL paging cycle. The UE 200 performs a mapping of the determined index value of the PO in the PF with a SN in the PF, the determined index value of the PF in the CEL paging cycle with a SFN, the determined index value of the PO in the CEL paging cycle with a SFN, and the determined index value of the PO in the CEL paging cycle with a SN in a PF in the CEL paging cycle. The mapping is based on mapping functions. The UE 200 thereafter monitors the PO in the mapped SN or SFN.

The NB 400 performs PDCCH transmission for the selected UEs (200). The NB 400 selects the repetition pattern (repetition number) of the PDCCH based on the estimated candidate CEL values of the UEs (200), selected for transmitting the paging message, and required number of repetitions corresponding to the determined candidate CEL values of the UEs.

In an embodiment, the required number of repetitions of the PDCCH is based on the highest CEL value supported by the cell.

In another embodiment, the required number of repetitions of the PDCCH is selected as follows: 1) Selecting the UE 200 with the highest candidate CEL value among the UEs selected for transmitting the paging message in the PO; and 2) The repetition number of the PDCCH corresponds to the candidate CEL value of the selected UE.

The UEs (200) receive the PDCCH by searching the PDCCH scrambled with P-RNTI in its configured search space and configured PO. If the UEs (200) decode the PDCCH transmission scrambled with P-RNTI, the UEs (200) initiates reception of the PDSCH transmitted by the NB 400; post terminating the decoding process. The initiation of the PDSCH is according to the repetition number and scheduled radio resources indicated in the decoded PDCCH. If the UEs (200) determine that a time interval between the termination of decoding of the PDCCH and the initiation of reception of the PDSCH exceeds a predefined threshold, then the UEs (200) switch from a connected mode to a sleep mode The embodiments of determining the required number of repetitions of the PDSCH are identical to the embodiments of determining the required number of repetitions of the PDCCH. As such, for the sake of brevity, they are not repeated here In an embodiment, the UEs (200) start decoding the PDSCH after successfully decoding the PDCCH in the configured PO. The decoding of the PDSCH by the UEs (200) involve the UEs (200) determining the repetition number of PDSCH and scheduled radio resources for PDSCH from the PDCCH in the UE's configured PO. Thereafter, the UEs (200) initiate decoding process of the PDSCH based on the determined repetition number and scheduled radio resources.

Figure 5:
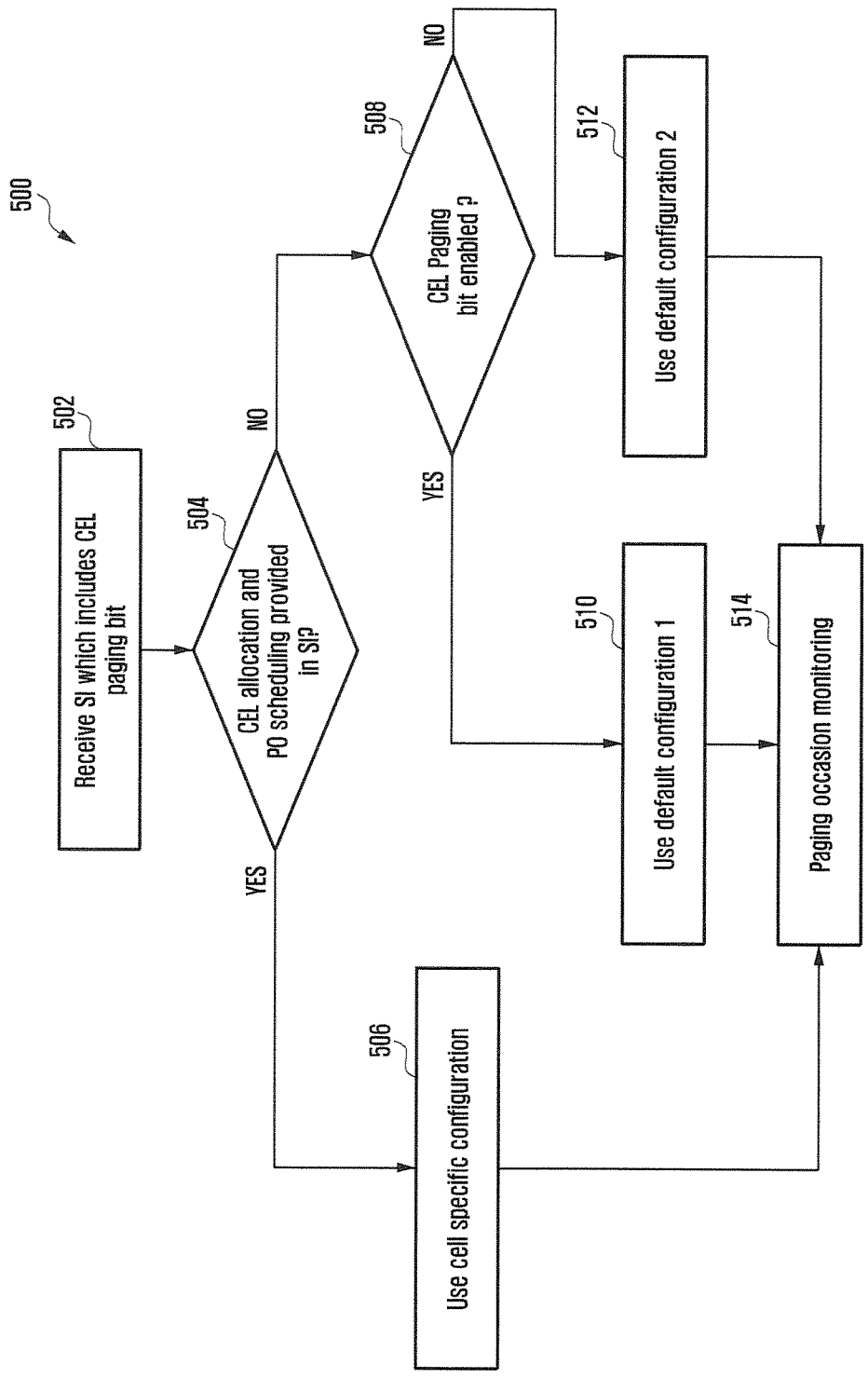
FIG. 5 illustrates a flowchart of a method for selecting paging configuration and performing PO monitoring according to the embodiments of the present disclosure.

FIG. 5 illustrates a flowchart 500 of a method for selecting paging configuration and performing PO monitoring according to the embodiments of the present disclosure. The method is implemented in the UE 200. At step 502, the method includes receiving System Information (SI), which includes a CEL paging bit.

At step 504, the method includes determining whether the information pertaining to CEL allocation and PO scheduling are included in the SI. This is analogous to configuration selection. The selection of a particular configuration is based on whether the CEL allocation and the PO scheduling are included in the SI. There are two types of configurations, viz., cell specific configuration and default user configuration. The default user configuration is further subdivided into default configuration 1 and default configuration 2. The configurations include procedures for performing the CEL allocation and the PO scheduling.

At step 506, the method includes utilizing cell specific configuration in response to determining that the CEL allocation procedure and the PF scheduling procedure are present in the SI. In cell specific configuration, the CEL allocation procedure and the PF scheduling procedure are unique to the cell in which the UE 200 is camped. At step 508, the method includes determining whether the CEL paging bit, included in the SI, is enabled. If the cell paging bit is enabled, then the method includes, at step 510, selecting the default configuration 1. On the other hand, if the cell paging bit is not enabled, then the method includes, at step 512, selecting the default configuration 2. The CEL allocation and the PO scheduling procedures in the default configuration 1 are utilized by the UE 200, when the CEL allocation and the PO scheduling procedures are not present in the SI and the CEL paging bit is enabled. The CEL allocation and the PO scheduling procedures in the default configuration 2 are utilized by the UE 200, when the CEL allocation and the PO scheduling procedures are not present in the SI and the CEL paging bit is disabled. At step 514, the method includes PO monitoring. The PO monitoring is based on the computed index values of the POs and PFs, which are used for mapping to particular SN and SFN.

The various actions, acts, blocks, steps, or the like in the flowchart 500 may be performed in the order presented, in a different order or simultaneously. Further, in some embodiments, some of the actions, acts, blocks, steps, or the like may be omitted, added, modified, skipped, or the like without departing from the scope of the invention. The method and other description provide a basis for a control program, which can be easily implemented by a microcontroller, microprocessor, or a combination thereof.

Figure 6:
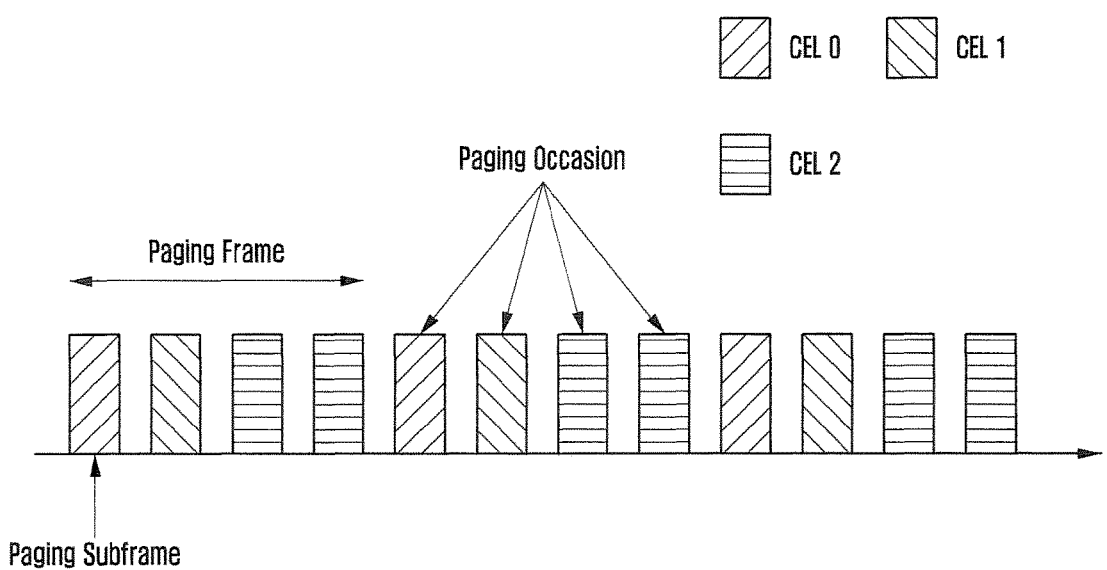
FIG. 6 illustrates an example CEL based PO scheduling in a single paging frame (PF) according to the embodiments of the present disclosure.

FIG. 6 illustrates an example CEL based PO scheduling in a single PF according to the embodiments of the present disclosure. As depicted in FIG. 6, the POs within a single PF are allocated to different CELs. The POs allocated to different CELs are scheduled across the subframes of each PF. In an example, if PO, is allocated to CEL 2, then the UEs (200) with CEL values within CEL 2 monitor PO$_i$. The CEL pattern is repeated for each PF. A predefined number of PFs constitute one CEL paging cycle. The CEL allocation and PF scheduling procedures, respectively, may or may not be present in the SI. If the CEL allocation and PF scheduling procedures are present in the SI, then the UE 200 selects the cell specific configuration. The CEL allocation and PF scheduling procedures in cell specific configuration are unique to the cell in which the UE 200 is camped.

Information of cell specific configuration is provided in the SI of the cell and includes the CEL paging bit, CEL allocation, and PF scheduling. The CEL paging bit is of 1 bit, which indicates whether coverage enhanced paging is enabled, or not, in the cell.

In an embodiment of CEL allocation, for each CEL value supported by the cell, the CEL allocation indicates the number of POs which are scheduled to each of the CELs in a PF. The number of POs can be power or 2.

In an embodiment of PO scheduling, for each value of PO index (i$_s$), which is calculated by the UE 200 for PO calculation, the method includes determining the position of a subframe within a PF. This mapping is represented by posSN. The SN number within a PF from a given value of i$_s$ is determined as: SN=posSN(i$_s$).

If the CEL allocation and PO scheduling procedures are not present in the SI, then the UE 200 selects one of the default user configurations, viz., default configuration 1 (DefConfig1) and default configuration 2 (DefConfig2).

In cased on default user configuration, initially, the UE 200 determines the value of the CEL paging bit using the SI in the cell. If CEL paging bit is false, i.e. coverage enhanced paging is not enabled, then DefConfig1 is used. If CEL paging bit is true, i.e. coverage enhanced paging is enabled, then DefConfig2 is used.

In one example of DefConfig1, for CEL allocation, all the POs within a PF are allocated to the highest CEL supported by the cell. For PO scheduling, the mapping of i$_s$ to SN is hardcoded in specification.

In another example of DefConfig2, for CEL allocation the following steps are performed: (1) initiate POcount as the number of POs in each PF; (2) initiate celCell as the highest CEL supported by the cell (3) if POcount is not zero. In this instance, increment the number of POs allocated to the celCell by 1 and decrement the POcount by 1; or if celCell is the lowest CEL supported by the cell, then go to step 2. Else: Update value of the celCell as the next lower CEL value supported by cell and go back to step 3.

For PO scheduling, the mapping of i$_s$ to SN is hardcoded in specification.

In an embodiment of configuration selection, if cell specific CEL allocation configuration is present in SI, then cell specific CEL allocation configuration is used. Else CEL allocation configuration available in default user configuration is used. If cell specific PO scheduling configuration is present in SI, then cell specific PO scheduling configuration is used. Else PO scheduling configuration available in default user configuration is used.

In an embodiment of paging occasion monitoring, it involves PF calculation and PO calculation. The PF calculation is performed as follows:

$$SFN \bmod T = \left(\frac{T}{N}\right) * (UE\_ID \bmod N)$$

here, T is the DRX cycle length in radio frames, N is determined using SI and represents number of frames available for paging within one DRX cycle, UE_ID is the UE identity used for paging frame and subframe calculation.

For PO calculation, candidate CEL of UE 200 is considered, which is CEL value reported by the UE 200 to the base station/core network when the UE 200 switches to connected mode. The UE 200 determines lowest CEL, which is greater than or equal to the candidate CEL value of the UE 200 such that at least one PO is allocated to the UE 200. The UE 200 determines value of PO index (i$_s$) as follows:

$$i_s = \sum_{k=0}^{i-1} N_{c_k} + \frac{UE\_ID}{N} \bmod N_{c_i}$$

here, N$_{ck}$ represents number of POs allocated for CEL 'k'.

The SN number within a PF from the determined i$_s$ as: SN=posSN (i$_s$).

Figure 7:
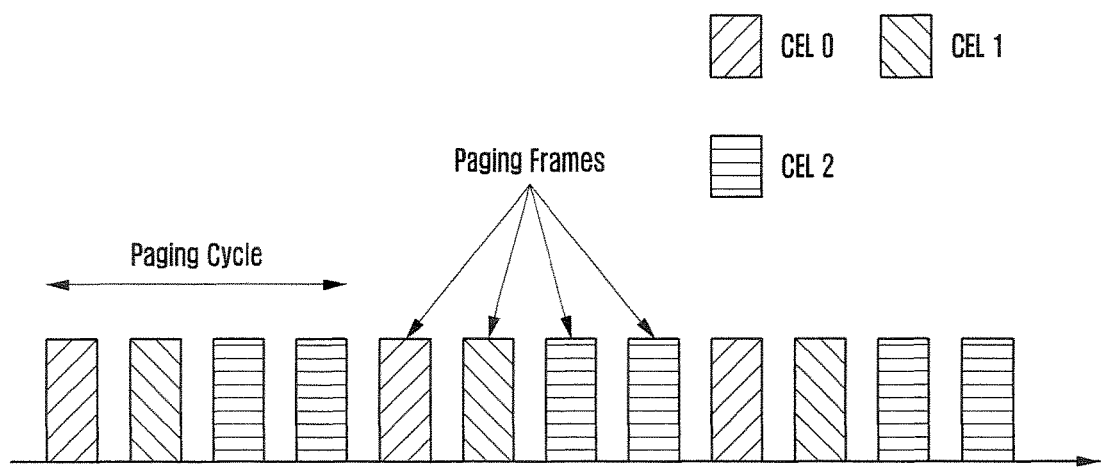
FIG. 7 illustrates an example CEL based PF scheduling in a single paging cycle according to the embodiments of the present disclosure.

FIG. 7 illustrates an example CEL based PF scheduling in a single paging cycle, in which POs are scheduled in subframes of each PF according to the embodiments of the present disclosure. As depicted in FIG. 7, the PFs within a single CEL paging cycle are allocated to different CELs. The PFs allocated to different CELs are scheduled across the CEL paging cycle, in which POs are scheduled across subframes of each of the PFs in the CEL paging cycle. In an example, if PF, is allocated to CEL 1, then the UEs (200) with CEL values within CEL 1 monitor PF$_i$. The CEL pattern is repeated for each CEL paging cycle. A predefined number of PFs constitute one CEL paging cycle. The CEL allocation and PF scheduling procedures, respectively, may or may not be present in the SI. If the CEL allocation and PF scheduling procedures are present in the SI, then the UE 200 selects cell specific configuration. The CEL allocation and PF scheduling procedures in cell specific configuration are unique to the cell in which the UE 200 is camped.

In an embodiment of cell specific configuration, this information is provided in the SI of the cell and includes the CEL paging bit, CEL paging cycle, CEL allocation, and PF scheduling. The CEL paging bit is of 1 bit, which indicates whether coverage enhanced paging is enabled, or not, in the cell.

CEL allocation: For each CEL value supported by the cell, the CEL allocation indicates the number of PFs which are scheduled to each of the CELs in a CEL paging cycle. The number of PFs can be power or 2.

In an embodiment of PF scheduling, for each value of PF index ($i_f$), which is calculated by the UE 200 for PO calculation, the method includes determining the position of a frame within a CEL paging cycle. This mapping is represented by offsetSFN. The SFN number within a CEL paging cycle from a given value of $i_f$ is determined as follows:

$$SFN=(SFN\_start+offsetSFN(i_f)) \bmod 1024)$$

here SFN_start is the first SFN of the CEL paging cycle.

If the CEL allocation and PF scheduling procedures are not present in the SI, then the UE 200 selects one of the default user configurations, viz., default configuration 1 (DefConfig1) and default configuration 2 (DefConfig2).

In case od default user configuration, initially, the UE 200 determines the value of the CEL paging bit using the SI in the cell. If CEL paging bit is false, i.e. coverage enhanced paging is not enabled, then DefConfig1 is used. If CEL paging bit is true, i.e. coverage enhanced paging is enabled, then DefConfig2 is used.

In case od DefConfig1, for CEL allocation, all the PFs within a CEL paging cycle are allocated to the highest CEL supported by the cell. For PF scheduling, the mapping function for mapping the determined $i_f$ to the SFN is as follows:

$$offsetSFN(i_f)=i_f*T/N$$

here T is the DRX cycle length in radio frames, and N is determined using SI and represents number of frames available for paging within one DRX cycle.

In an embodiment of DefConfig2, for CEL allocation the following steps are performed: (1) initiate PFcount as the number of PFs in each CEL paging cycle; (2) initiate celCell as the highest CEL supported by the cell; and (3) if PFcount is not zero: (1) increment the number of PFs allocated to the celCell by 1 and decrement the PFcount by 1; and (2) if celCell is the lowest CEL supported by the cell, then go to step 2. Else: Update value of the celCell as the next lower CEL value supported by cell and go back to step 3.

For PF scheduling, the mapping function for mapping the determined $i_f$ to the SFN is identical to that in the DefConfig1.

In an embodiment of configuration selection, if cell specific CEL allocation configuration is present in SI, then cell specific CEL allocation configuration is used. Else CEL allocation configuration available in default user configuration is used. If cell specific PF scheduling configuration is present in SI, then cell specific PF scheduling configuration is used. Else PF scheduling configuration available in default user configuration is used.

In an embodiment of paging occasion monitoring, it involves PF calculation and PO calculation. For PF calculation, candidate CEL of UE 200 is considered, which is CEL value reported by the UE 200 to the base station/core network when the UE 200 switches to connected mode. The UE 200 determines lowest CEL, which is greater than or equal to the candidate CEL value of the UE 200 such that atleast one PF is allocated to the UE 200. The SFN_start for CEL paging cycle is determined as:

$$SFN_{start} \bmod T = \left(T * \frac{N_c}{N}\right)\left(UE\_ID \bmod \frac{N}{N_c}\right)$$

The PF index within the CEL paging cycle is determined as:

$$i_f = \sum_{k=0}^{i-1} N_{c_k} + \frac{UE\_ID * N_c}{N} \bmod N_{c_i}$$

The SFN is determined as:

$$SFN=(SFN\_start+offsetSFN(i_f)) \bmod 1024$$

here, T is the DRX cycle length in radio frames, N is determined using SI and represents number of frames available for paging within one DRX cycle, UE_ID is the UE identity used for paging frame and subframe calculation, $N_c$ is the number of PFs in one CEL paging cycle, and $N_{ci}$ represents number of PFs allocated for CEL 'i.'

For PO calculation, the UE 200 determines value of PO index ($i_s$) as follows:

$$i_s = \frac{UE\_ID * N_c}{N * N_{c_i}} \bmod N_s$$

here, $N_s$ is number of POs within one PF and the mapping from $i_s$ to SN follows the mapping defined in legacy procedure.

Figure 8:
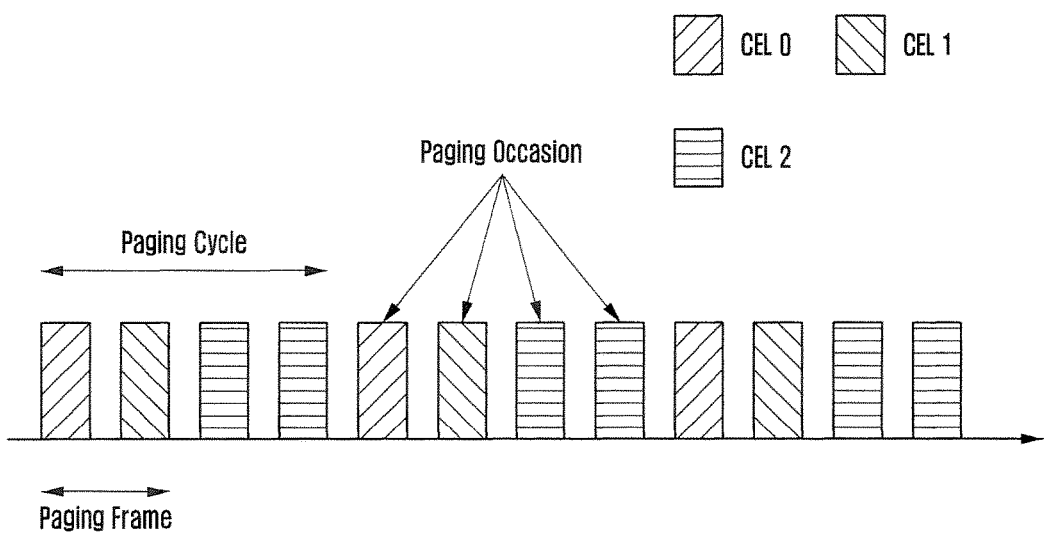
FIG. 8 illustrates an example CEL based PO scheduling in a single paging cycle according to the embodiments of the present disclosure.

FIG. 8 illustrates an example CEL based PO scheduling in a single paging cycle, in which the POs are scheduled in the PFs in the paging cycle, according to the embodiments of the present disclosure. As depicted in FIG. 8, the POs within a single CEL paging cycle are allocated to different CELs. The POs allocated to different CELs are scheduled across the subframes of the CEL paging cycle, in which the POs are associated with the subframes of each of the PFs in the CEL paging cycle. In an example, if PO, is allocated to CEL 3, then the UEs (200) with CEL values within CEL 3 monitor PO$_i$. The CEL pattern is repeated for each CEL paging cycle. A predefined number of PFs constitute one CEL paging cycle. The CEL allocation and PF scheduling procedures, respectively, may or may not be present in the SI. If the CEL allocation and PO scheduling procedures are present in the SI, then the UE 200 selects the cell specific configuration. The CEL allocation and PO scheduling procedures in cell specific configuration are unique to the cell in which the UE 200 is camped.

In an embodiment of cell specific configuration, this information is provided in the SI of the cell and includes the CEL paging bit, CEL paging cycle, CEL allocation, and PO scheduling. The CEL paging bit is of 1 bit, which indicates whether coverage enhanced paging is enabled, or not, in the cell.

CEL allocation: For each CEL value supported by the cell, the CEL allocation indicates the number of POs which are scheduled in a CEL paging cycle. The number of POs can be power or 2.

In an embodiment of PO scheduling, for each value of PO index ($i_t$), which is calculated by the UE 200 for PO calculation, the method includes determining the position of a frame within a CEL paging cycle. This mapping is represented by offsetSFN. The SFN number within a CEL paging cycle from a given value of $i_t$ is determined as follows:

SFN=(SFN_start+offsetSFN($i_t$))mod 1024)

here SFN_start is the first SFN of the CEL paging cycle.

The method includes determining the position of a subframe associated with the PO within a PF. This mapping is represented by posSN. The SN number within a PF in a CEL paging cycle from a given value of $i_t$ is determined as: SN=posSN($i_t$). Here the SN is the subframe number associated with a PO within a PF in the CEL paging cycle.

If the CEL allocation and PF scheduling procedures are not present in the SI, then the UE 200 selects one of the default user configurations, viz., default configuration 1 (DefConfig1) and default configuration 2 (DefConfig2).

In an embodiment of default user configuration, initially, the UE 200 determines the value of the CEL paging bit using the SI in the cell. If CEL paging bit is false, i.e. coverage enhanced paging is not enabled, then DefConfig1 is used. If CEL paging bit is true, i.e. coverage enhanced paging is enabled, then DefConfig2 is used.

In an embodiment of DefConfig1, for CEL allocation, all the POs within a CEL paging cycle are allocated to the highest CEL supported by the cell. For PO scheduling, the mapping function for mapping the determined $i_t$ to the SFN is as follows:

offsetSFN($i_t$)=$i_t$*T/N*$N_S$ $i_s$ is initially determined from $i_t$ as: $i_S$=$i_t$ mod$N_S$. The mapping function for mapping the determined $i_s$ to the SN is hardcoded in specification.

here T is the DRX cycle length in radio frames, N is determined using SI, which represents number of frames available for paging within one DRX cycle and $N_s$ is number of POs within one PF.

In an embodiment of DefConfig2, for CEL allocation the following steps are performed: 1) initiate POcount as the number of POs in each CEL paging cycle; 2) initiate celCell as the highest CEL supported by the cell; and 3) if POcount is not zero: (1) increment the number of POs allocated to the celCell by 1 and decrement the POcount by 1; or (2) If celCell is the lowest CEL supported by the cell, then go to step 2. Else: Update value of the celCell as the next lower CEL value supported by cell and go back to step 3.

For PO scheduling, the mapping function for mapping the determined $i_t$ to the SFN and mapping the determined $i_s$ to the SN is identical to that in the DefConfig1.

In an embodiment of configuration selection, if cell specific CEL allocation configuration is present in SI, then cell specific CEL allocation configuration is used. Else CEL allocation configuration available in default user configuration is used. If cell specific PO scheduling configuration is present in SI, then cell specific PO scheduling configuration is used. Else PO scheduling configuration available in default user configuration is used.

In an embodiment of paging occasion monitoring, it involves PF calculation and PO calculation. For PF calculation, candidate CEL of UE 200 is considered, which is CEL value reported by the UE 200 to the base station/core network when the UE 200 switches to connected mode. The UE 200 determines lowest CEL, which is greater than or equal to the candidate CEL value of the UE 200 such that atleast one PF is allocated to the UE 200. The SFN_start for CEL paging cycle is determined as follows:

$$SFN_{start} \bmod T = \left(T * \frac{N_c}{N}\right)\left(UE\_ID \bmod \frac{N}{N_c}\right)$$

The PO index within the CEL paging cycle is determined as follows:

$$i_t = \sum_{k=0}^{i-1} N_{c_k} + \frac{UE\_ID * N_c}{N} \bmod N_{c_i}$$

The SFN is determined as follows:

SFN=(SFN_start+offsetSFN($i_t$))mod 1024 here, T is the DRX cycle length in radio frames, N is determined using SI and represents number of frames available for paging within one DRX cycle, UE_ID is the UE identity used for paging frame and subframe calculation, $N_c$ is the number of PFs in one CEL paging cycle, and $N_{ci}$ represents number of POs allocated for CEL For PO calculation, SN is mapped from $i_t$ is as: SN=posSN($i_t$).

Figure 9:
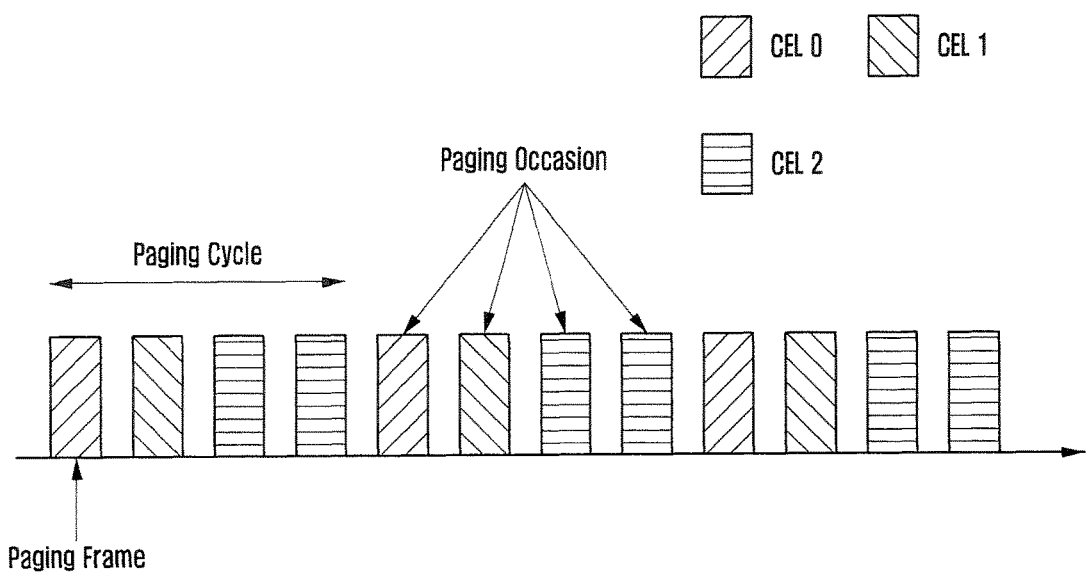
FIG. 9 illustrates another example CEL based PO scheduling in a single paging cycle according to the embodiments of the present disclosure.

FIG. 9 illustrates another example CEL based PO scheduling in a single paging cycle, in which the POs are scheduled in the PFs in the paging cycle, according to the embodiments of the present disclosure. As depicted in FIG. 9, the POs within a single CEL paging cycle are allocated to different CELs. The POs allocated to different CELs are scheduled across the subframes of the CEL paging cycle, in which the POs are associated with the subframes of each of the PFs in the CEL paging cycle. In an example, if PO, is allocated to CEL 1, then the UEs (200) with CEL values within CEL 1 monitor PO$_i$. The CEL pattern is repeated for each CEL paging cycle. A predefined number of PFs constitute one CEL paging cycle. The CEL allocation and PF scheduling procedures, respectively, may or may not be present in the SI. If the CEL allocation and PO scheduling procedures are present in the SI, then the UE 200 selects the cell specific configuration. The CEL allocation and PO scheduling procedures in cell specific configuration are unique to the cell in which the UE 200 is camped.

In an embodiment of cell specific configuration, this information is provided in the SI of the cell and includes the CEL paging bit, CEL paging cycle, CEL allocation, and PO scheduling. The CEL paging bit is of 1 bit, which indicates whether coverage enhanced paging is enabled, or not, in the cell.

CEL allocation: For each CEL value supported by the cell, the CEL allocation indicates the number of POs which are scheduled in a CEL paging cycle. The number of POs can be power or 2.

PO scheduling: For each value of PF index ($i_f$), which is calculated by the UE 200 for PO calculation, the method includes determining the position of a frame within a CEL paging cycle. This mapping is represented by offsetSFN. The SFN number within a CEL paging cycle from a given value of $i_t$ is determined as follows:

SFN=(SFN_start+offsetSFN($i_f$))mod 1024)

It is to be noted that prior to performing the mapping, $i_t$ is determined. Thereafter $i_f$ is determined using $i_t$. Once $i_f$ is determined, the mapping is performed. Here SFN_start is the first SFN of the CEL paging cycle.

The method includes determining the position of a subframe associated with the PO within a PF. This mapping is represented by posSN. The SN number within a PF in a CEL paging cycle from a given value of $i_s$ is determined as: SN=posSN($i_s$). It is to be noted that prior to performing the mapping, $i_t$ is determined. Thereafter $i_s$ is determined using $i_t$. Once $i_s$ is determined, the mapping is performed. Here the SN is the subframe number associated with a PO within a PF in the CEL paging cycle.

If the CEL allocation and PF scheduling procedures are not present in the SI, then the UE 200 selects one of the default user configurations, viz., default configuration 1 (DefConfig1) and default configuration 2 (DefConfig2).

In an embodiment of default user configuration, initially, the UE 200 determines the value of the CEL paging bit using the SI in the cell. If CEL paging bit is false, i.e. coverage enhanced paging is not enabled, then DefConfig1 is used. If CEL paging bit is true, i.e. coverage enhanced paging is enabled, then DefConfig2 is used.

In an embodiment of DefConfig1, for CEL allocation, all the POs within a CEL paging cycle are allocated to the highest CEL supported by the cell. For PO scheduling, the mapping function for mapping the determined $i_f$ to the SFN is as follows:

$$\text{offsetSFN}(i_f) = i_f \cdot T/N$$

In order to determine $i_f$, $i_t$ is determined. Thereafter $i_f$ is determined using $i_t$. For PO calculation, $i_s$ is determined from $i_t$ as: $i_s = i_t \bmod N_s$. The mapping function for mapping the determined $i_s$ to the SN is hardcoded in the specification. here T is the DRX cycle length in radio frames, and N is determined using SI, which represents number of frames available for paging within one DRX cycle.

In an embodiment of DefConfig2, the CEL allocation procedure is identical to the DefConfig2 described in FIG. 8. As such, it is not repeated here. The PO scheduling is identical to that in the DefConfig1.

In an embodiment of configuration selection, it is identical to the configuration selection described in FIG. 8.

In an embodiment of paging occasion monitoring, it involves PF calculation and PO calculation. For PF calculation, candidate CEL of UE 200 is considered, which is CEL value reported by the UE 200 to the base station/core network when the UE 200 switches to connected mode. The UE 200 determines lowest CEL, which is greater than or equal to the candidate CEL value of the UE 200 such that atleast one PF is allocated to the UE 200. The SFN_start for CEL paging cycle is determined as:

$$SFN_{start} \bmod T = \left(T * \frac{N_c}{N}\right)\left(\text{UE\_ID} \bmod \frac{N}{N_c}\right)$$

Initially, the PO index in the CEL paging cycle is determined. Thereafter, the PF index within the CEL paging cycle is determined. The equations are as follows:

$$i_t = \sum_{k=0}^{i-1} N_{c_k} + \frac{\text{UE\_ID} * N_c}{N} \bmod N_{ci} \text{ and } i_f = \frac{i_t}{N_s}$$

The SFN is determined as:

$$\text{SFN} = (\text{SFN\_start} + \text{offsetSFN}(i_f)) \bmod 1024$$

Here, T is the DRX cycle length in radio frames, N is determined using SI and represents number of frames available for paging within one DRX cycle, UE_ID is the UE identity used for paging frame and subframe calculation, $N_c$ is the number of PFs in one CEL paging cycle, and $N_{ci}$ represents number of POs allocated for CEL 'i'.

For PO calculation, $i_s$ is determined from $i_t$ as: $i_s = i_t \bmod N_s$. Thereafter the SN is mapped from $i_s$ as: SN=posSN($i_s$).

Figure 10:
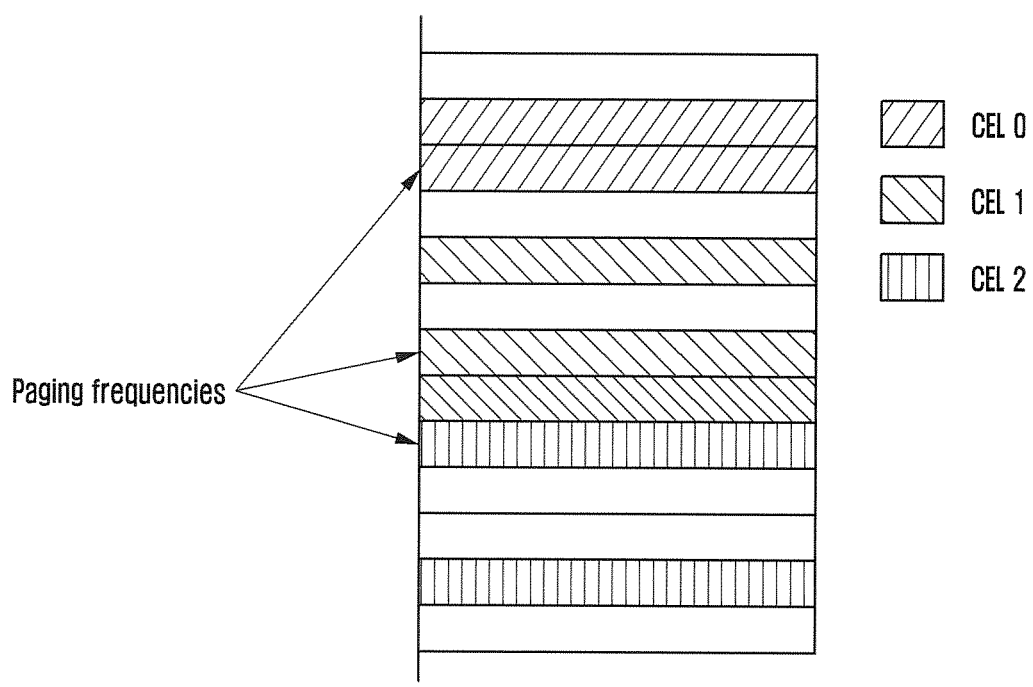
FIG. 10 illustrates an example CEL based allocation of paging frequencies in which the paging frequencies are allocated to the POs according to the embodiments of the present disclosure.

FIG. 10 illustrates an example CEL based allocation of paging frequencies in which the paging frequencies are allocated to the POs, according to the embodiments of the present disclosure. As depicted in FIG. 10, different paging frequencies are allocated to different CELs. In an example, if $\text{Freq}_i$ is allocated to $\text{CEL}_k$, then the UEs belonging to $\text{CEL}_k$ will monitor $\text{Freq}_i$. Each of the paging frequencies is associated with a PO, which is monitored by the UEs (200). The CEL allocation and PF scheduling procedures, respectively, may or may not be present in the SI. If the CEL allocation and PO scheduling procedures are present in the SI, then the UE 200 selects the cell specific configuration. The CEL allocation and PO scheduling procedures in cell specific configuration are unique to the cell in which the UE 200 is camped.

In an embodiment of cell specific configuration, this information is provided in the SI of the cell and includes the CEL paging bit, CEL allocation, and PO scheduling. The CEL paging bit is of 1 bit, which indicates whether coverage enhanced paging is enabled, or not, in the cell.

In an embodiment of CEL allocation, for each CEL value supported by the cell, the CEL allocation indicates the number of paging frequencies which are allocated to the CEL.

In an embodiment of PO scheduling, for each value of frequency index ($i_F$), which is calculated by the UE 200 for PO calculation, the method includes mapping $i_F$ to a frequency position. This mapping is represented by posFreq. The frequency position from a given value of $i_F$ is determined as: Freq=posFre($i_F$).

If the CEL allocation and PF scheduling procedures are not present in the SI, then the UE 200 selects one of the default user configurations, viz., default configuration 1 (DefConfig1) and default configuration 2 (DefConfig2).

In an embodiment of default user configuration, initially, the UE 200 determines the value of the CEL paging bit using the SI in the cell. If CEL paging bit is false, i.e. coverage enhanced paging is not enabled, then DefConfig1 is used. If CEL paging bit is true, i.e. coverage enhanced paging is enabled, then DefConfig2 is used.

In an embodiment of DefConfig1, for CEL allocation, all paging frequencies are allocated to the highest CEL supported by the cell. For PO scheduling, the mapping function for mapping the determined $i_F$ to the SFN is hardcoded in specification.

In an embodiment of DefConfig2, for CEL allocation the following steps are performed: 1) initiate Freqcount as the number of available paging frequencies; and 2) initiate celCell as the highest CEL supported by the cell; and 3) If Freqcount is not zero: (1) increment the number of frequencies allocated to the celCell by 1 and decrement the Freqcount by 1; and (2) If celCell is the lowest CEL supported by the cell, then go to step 2. Else: Update value of the celCell as the next lower CEL value supported by cell and go back to step 3.

For PO scheduling, the mapping of $i_F$ to a paging frequency is as defined in specification.

In an embodiment of Configuration Selection, if cell specific CEL allocation configuration is present in SI, then cell specific CEL allocation configuration is used. Else CEL allocation available in default user configuration is used. If cell specific PO scheduling configuration is present in SI, then cell specific PO scheduling configuration is used. Else PO scheduling configuration available in default user configuration is used.

In an embodiment of paging occasion monitoring, it involves paging frequency calculation, PF calculation, and PO. The paging frequency calculation is performed as follows: The candidate CEL of the UE 200 is considered, which is CEL value reported by the UE 200 to the base station/core network when the UE 200 switches to connected mode. The UE 200 determines lowest CEL, which is greater than or equal to the candidate CEL value of the UE 200 such that atleast one PO is allocated to the UE 200. The UE 200 determines the value of frequency index ($i_F$) as follows:

$$i_f = \sum_{k=0}^{i-1} N_{c_k} + \text{UE\_ID\_F} \bmod N_{c_i}$$

Here, $N_{c_k}$ represents number of paging frequencies allocated for CEL 'k', UE_ID_F is the UE identification used for paging frequency calculation. The frequency position is determined according to the mapping function as: Freq=posFre($i_F$).

The PF calculation is performed as follows:

$$SFN \bmod T = \left(\frac{T}{N}\right) * (\text{UE\_ID} \bmod N)$$

Here, T is the DRX cycle length in radio frames, N is determined using SI and represents number of frames available for paging within one DRX cycle, UE_ID is the UE identity used for paging frame and subframe calculation.

The PO calculation is performed as follows:

$i\_s = \text{floor}(\text{UE\_ID}/N) \bmod N_s$ here, Ns is the number of subframes available for paging within one frame.

Another embodiment of the proposed method implemented in the UE 200 for performing paging configuration and monitoring is: the UE 200 monitors paging messages in a paging frequency/PO, which is determined based on type of service supported by the UE 200. If the UE 200 supports multiple services, or UE is not aware of the position of the paging frequency corresponding to a particular type of service, the cellular network provides the position of paging frequency/PO, wherein the UE 200 is configured to receive paging messages. This information can be provided by SI or can be transmitted directly to the UE 200.

The embodiments disclosed herein can be implemented through at least one software program running on at least one hardware device and performing network management functions to control the elements. The elements shown in the FIGS. 1a through 10 include blocks which can be at least one of a hardware device, or a combination of hardware device and software module.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a user equipment (UE) for determining paging occasion (PO) in extended discontinuous reception (eDRX), the method comprising:
   determining a paging hyper-frame (PH) based on a first UE identity;
   determining paging window (PW) based on the first UE identity;
   determining a paging frame (PF) based on a second UE identity; and
   determining the PO in the PF based on the second UE identity, wherein:
   the first UE identity and the second UE identity are different;
   a first radio frame of the PW is determined based on the first UE identity and an eDRX cycle of the UE in hyper-frames; and
   a last radio frame of the PW is determined based on the first radio frame of the PW and a length of the PW.

2. The method of claim 1, wherein the PH is determined based on the first UE identity and the eDRX cycle of the UE in the hyper-frames.

3. The method of claim 1, wherein the PO is determined based on an index associated with the PO, and the index associated with the PO is determined based on the second UE identity.

4. The method of claim 1, wherein the first UE identity is determined based on a system architecture evolution-temporary mobile subscriber identity (S-TMSI).

5. The method of claim 1, wherein the second UE identity is determined based on an international mobile subscriber identity (IMSI).

6. The method of claim 1, further comprising:
   monitoring the PO for receiving a paging message for the UE.

7. A user equipment (UE) for determining paging occasion (PO) in extended discontinuous reception (eDRX), the UE comprising:
   transceiver configured to transmit and receive a signal; and
   controller configured to determine a paging hyper-frame (PH) based on a first UE identity, to determine paging window (PW) based on the first UE identity, to determine a paging frame (PF) based on a second UE identity, and to determine the PO in the PF based on the second UE identity,
   wherein the first UE identity and the second UE identity are different, and
   wherein the controller is configured to determine a first radio frame of the PW based on the first UE identity and an eDRX cycle of the UE in hyper-frames, and to determine a last radio frame of the PW based on the first radio frame of the PW and length of the PW.

8. The UE of claim 7, wherein the PH is determined based on the first UE identity and the eDRX cycle of the UE in the hyper-frames.

9. The UE of claim 7, wherein the PO is determined based on an index associated with the PO, and the index associated with the PO is determined based on the second UE identity.

10. The UE of claim 7, wherein the first UE identity is determined based on a system architecture evolution-temporary mobile subscriber identity (S-TMSI).

11. The UE of claim 7, wherein the second UE identity is determined based on an international mobile subscriber identity (IMSI).

12. The UE of claim 7, wherein the controller is configured to monitor the PO for receiving a paging message for the UE.

\* \* \* \* \*